United States Patent [19]  [11] Patent Number: 4,937,781
Lee et al.  [45] Date of Patent: Jun. 26, 1990

[54] DUAL PORT RAM WITH ARBITRATION STATUS REGISTER

[75] Inventors: Robert D. Lee, Denton; Hal Kurkowski, Dallas, both of Tex.

[73] Assignee: Dallas Semiconductor Corporation, Dallas, Tex.

[21] Appl. No.: 194,028

[22] Filed: May 13, 1988

[51] Int. Cl.$^5$ .............................................. G06F 13/18
[52] U.S. Cl. ............................... 364/900; 364/937.01; 364/965.9; 365/230.05
[58] Field of Search ............................. 364/200, 900; 365/189.01, 189.07, 230.05

[56] References Cited

U.S. PATENT DOCUMENTS

| | | | |
|---|---|---|---|
| 4,415,972 | 11/1983 | Adcock | 364/200 |
| 4,580,245 | 4/1986 | Ziegler et al. | 365/154 |
| 4,602,253 | 7/1986 | Kreft . | |
| 4,616,347 | 10/1986 | Bernstein | 365/230.05 |
| 4,627,019 | 12/1986 | Ng | 364/900 |
| 4,627,030 | 12/1986 | Barber | 365/230.05 |
| 4,633,440 | 12/1986 | Pakulski | 365/230.05 X |
| 4,660,177 | 4/1987 | O'Connor | 365/154 |

OTHER PUBLICATIONS

Bursky, "Talking over RF Links, Micropower ICs Transfer Data and Status", Aug. 25, 1988, issue of *Electronics Design*.

Primary Examiner—Thomas M. Heckler
Attorney, Agent, or Firm—Worsham, Forsythe, Sampels & Wooldridge

[57] ABSTRACT

A dual port RAM includes an arbiter (10) which interfaces between a random access memory (12) and two ports, a serial port (19) and a parallel port (21). The arbiter (10) has an internal arbitration byte (38) for storing status information. The arbiter operates in first and second modes. In the first mode, the serial port (19) is afforded priority access to the system with status information stored in the arbitration byte (38). The parallel port (21) polls the arbitration byte (38) to determine the system status. In the second mode, the first port to attempt access is provided priority and this information is stored in the arbitration byte (38). In this mode, each port attempting access must poll the arbitration byte (38) before attempting access.

22 Claims, 12 Drawing Sheets

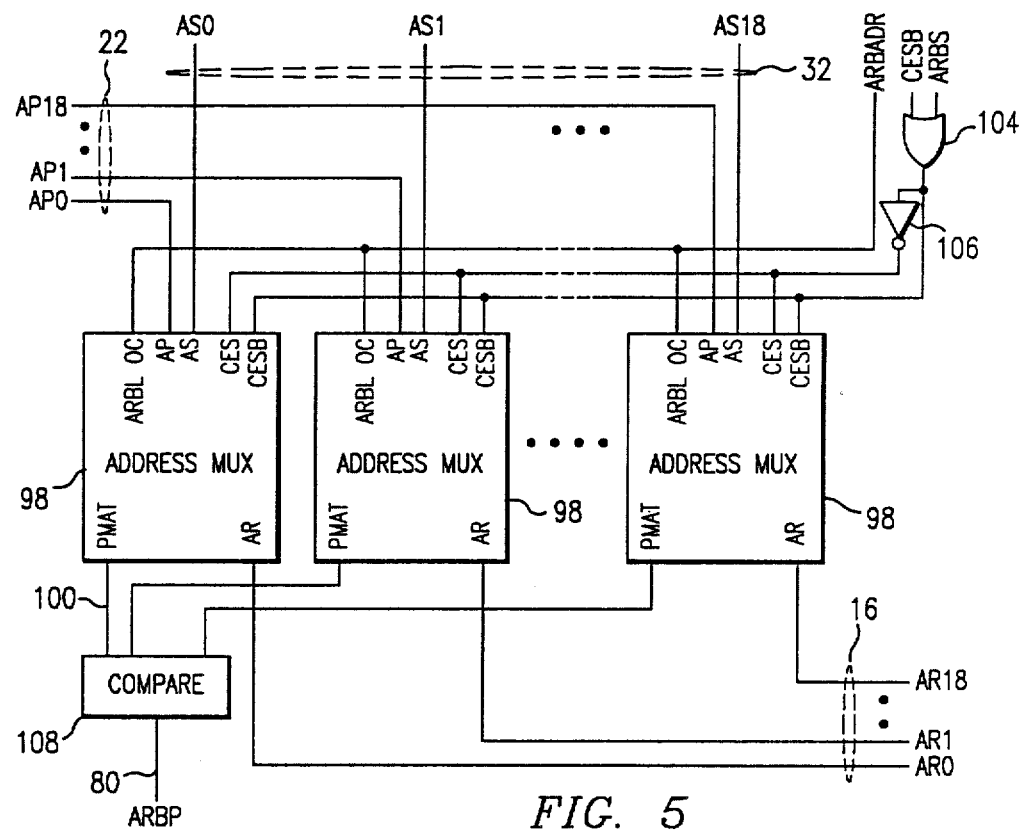
FIG. 5
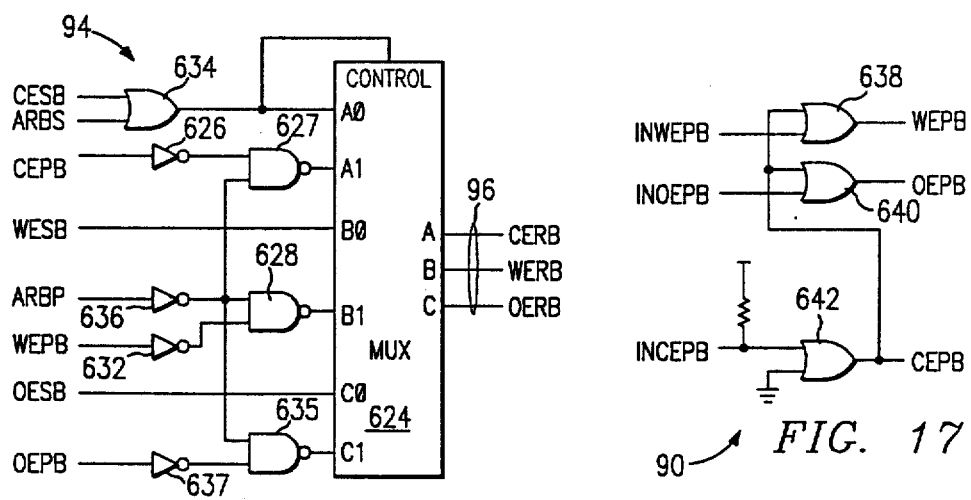
FIG. 16
FIG. 17

DUAL PORT RAM WITH ARBITRATION STATUS REGISTER

TECHNICAL FIELD OF THE INVENTION

The present invention pertains in general to a Random Access Memory (RAM), and more particularly, to a dual port RAM.

CROSS-REFERENCE TO RELATED APPLICATION

This application is related to U.S. patent application Ser. No. 194,025, entitled "Interleaved Arbitration Scheme for Interfacing Parallel and Serial Ports to a Parallel System Port", filed 5/13/88.

BACKGROUND OF THE INVENTION

The introduction of low-cost microprocessors has been one impetus in the push towards distributed processing. Almost all such microprocessors have the capability and the standard interfaces to be interconnected into distributed processing systems. In such systems, processors may be installed at remote sites near where processing is needed, and intercommunication among processors is usually done utilizing serial transmission techniques.

The 16- and 32-bit microprocessors, however, contain both hardware and software interlocks that provide a capability for multiprocessor system configurations. Such configurations can be done either by satellite processing (i.e. using special coprocessors), or by utilizing I/O processors that free the CPU from complex tasks that formerly required considerable CPU time.

These external intelligent requesters cooperate, and compete, for mastership not only of the common shared bus or system bus, but also of other shared resources of the system (e.g., memory, I/O space, peripherals, etc.). In such cases, a management protocol is required to make the relationship more equitable than a common master-slave relationship in which the resource-request line is dominated by a single system component. In the most general case, external intelligent requesters may all be CPUs and thus form a multiprocessor system in which each resource requester has equal importance and capability. In this way, functions may be distributed fully among those CPUs sharing common system resources such as memory. A system designer can thus partition the problem into separate tasks that each of several processors can handle individually and in parallel, increasing system performance and throughput. In such configurations, these complete and self-contained systems intercommunicate utilizing parallel transmission techniques, usually via the system bus. Appropriate connection links among processors are provided to free the system's designer from having to define which is the master and which is the slave. These are typically referred to as bus arbiters. Furthermore, the system bus allows each processor to work asynchronously and, therefore, both fast and slow microprocessors can be incorporated in the same system.

The most important considerations in multiprocessor systems utilizing an arbitration scheme are: (1) the processors should be able to interact properly with each other or with a peripheral unit without mangling the data; (2) they should be able to share system resources; and (3) synchronization among the processors should be ensured. Usually, a mechanism is formed to assure that these requisites are provided by software operating systems, but they do require proper hardware support. Most conventional microprocessors have appropriate control pins and special instructions for semaphore signaling, which temporarily renders one CPU the "system master" that controls a certain critical shared resource, such as a memory, and excludes all other processors from utilizing this resource. Such hardware support allows the development of operating systems that provide the mechanisms for multiprocessing implementation.

BRIEF DESCRIPTION OF THE DRAWINGS

For a more complete understanding of the present invention and the advantages thereof, reference is now made to the following description taken in conjunction with the accompanying Drawings in which:

FIG. 5 illustrates a block diagram of the address multiplexer;

FIG. 16 illustrates a logic diagram of the control mux; and

FIG. 17 illustrates a logic diagram of the parallel port buffers.

Figure 1:
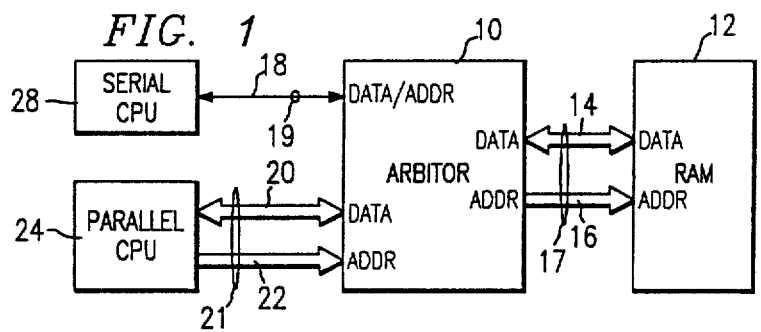
FIG. 1 illustrates a top level block diagram of the dual port RAM of the present invention.

It will be appreciated that for purposes of clarity and where deemed appropriate, reference numerals have been repeated in the figures to indicate corresponding features.

SUMMARY OF THE INVENTION

The present invention disclosed and claimed herein comprises a multi-port RAM having an array of memory locations for storing data, with each of the memory locations having an address associated therewith. A plurality of ports are provided, each for receiving an address and for transfer of data. A separate arbitration storage register is provided for storing arbitration status information, the arbitration register having an arbitration address associated therewith. Data/address transfer circuitry is provided for selecting one of the ports for access to the array and transferring the address received by the selected one of the ports to the array and transferring data between the select one of the ports and the array. The received address from each one of the ports is first compared with an internally stored reference arbitration address to determine if the address received thereon is the arbitration address. If the arbitration address has been received, the arbitration register is accessed and the contents thereof output to the one of the ports from which the arbitration address was received. For ports receiving addresses other then the arbitration address, priority is first determined in accordance with a predetermined priority status and then the highest priority one of the ports attempting access to the array is determined to be the selected port.

In yet another embodiment of the present invention, the priority status is determined on a first come first serve basis. Information as to the status of the system is stored in the arbitration register for output to each of the ports from which the arbitration address was received. Alternatively, a priority status is assigned to each of the ports such that the highest priority one thereof from which an address other than the arbitration address is received is selected.

In yet another embodiment of the present invention, the arbitration register includes a plurality of data fields that comprise the arbitration status information, each data field associated with one of the ports. Data is transferred from a port to the associated data field after receiving the arbitration address and write control information from that port. Similarly, arbitration status information is read from the arbitration register only when both the arbitration address is received and read control information is received from the port. Further, a status field is also provided in the arbitration register for containing system status information for transmission to the ones of the ports receiving both an arbitration address and read control information.

DETAILED DESCRIPTION OF THE INVENTION

DUAL PORT RAM

Referring now to FIG. 1, there is illustrated a block diagram of the dual port RAM of the present invention. An arbiter 10 is provided for interfacing with a random access memory (RAM) 12 through a system port 17 having a bi-directional system data bus 14 and a system address bus 16 in addition to a control bus 15. The arbiter 10 is operable to select between a serial port 19, that is interfaced with a serial data link 18 containing both data and address information, and a parallel port 21, that is interfaced with a bi-directional data bus 20 and an address bus 22 in addition to a control bus 13. The parallel data and addresses associated with the data bus 20 and the address bus 22 and the control signals associated with control bus 13 are typically received from a CPU referred to hereinafter as a parallel CPU 24. The serial data link 18 is typically interfaced with a CPU referred to hereinafter as a serial CPU 28. As will be described in more detail hereinbelow, the serial CPU 28 and the parallel CPU 24 are operable to poll the arbiter 10 to determine the availability of the system data bus 14 and the system address bus 16 through transmission of an address thereto. Further, information can be stored in the arbiter 10 providing handshake information between the two CPUs 24 and 28.

In operation, both the serial port 19 and the parallel port 21 appear as two separate ports to the dual port RAM. Since only one port can access the RAM at any one time for a Read or a Write operation, the arbiter 10 must make a decision as to which of the serial port 19 or parallel port 21 can have access to the system. This decision can be made on either a priority basis or on a first come first serve basis.

In the preferred embodiment, there are two modes of operation which will be described in more detail hereinbelow with respect to the operation of the arbiter 10. In the first mode, the serial port 19 is designated as having priority access to the system. That is, when an address is sent out by the serial port 19, total access by the parallel port 21 is inhibited. As will be described hereinbelow, the parallel port 21 must then determine certain parameters of data and address transfer on the serial port 19 to determine when the system is free. This is termed "interleaved arbitration" which is the subject matter of co-pending patent application Ser. No. 194,025 entitled "Interleaved Arbitration Scheme for Interfacing Parallel and Serial Ports to a Parallel System Port". The parallel port 21 must therefore be apprised of whether the serial port is accessing the RAM 12 in order to determine when it can access the RAM 12. This is facilitated by an internal storage register referred to as an arbitration byte which contains status information of the arbiter 10. The parallel port 21 polls this arbitration byte to determine the status of the arbiter 10 and thus be provided with information as to whether the serial port has accessed the system.

In the second mode of operation, access to the system is determined on a first come first serve basis. In this mode, the first port to access the system is the port that is afforded access to the RAM 12. The arbitration byte is utilized in this mode to output status information to any of the ports desiring access in order to apprise that port as to whether the system is busy, if so, the port attempting access must continually poll the arbitration byte to determine when the system is not busy and when it can access the system. In this mode, the arbitration byte is operable to be read by either port and to have information written therein to provide information to the other port that it is using the system. Further, status information about the system can be stored in the arbitration byte for output to either of the ports.

Figure 2:
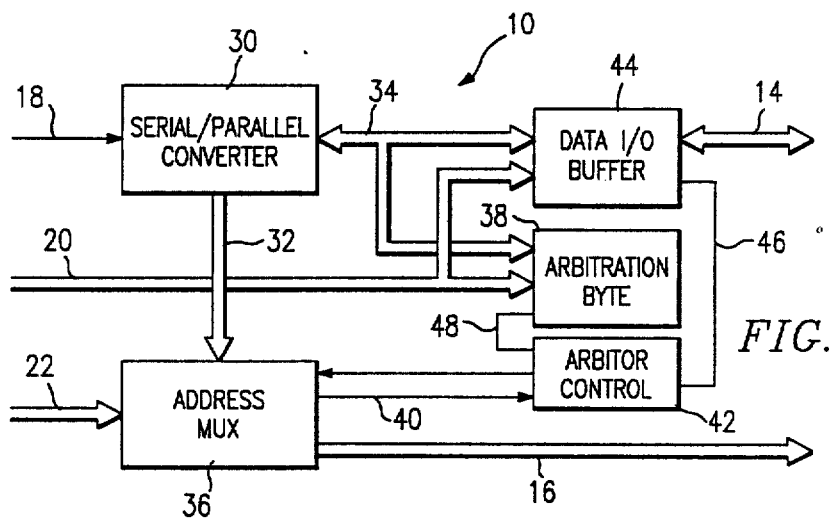
FIG. 2 illustrates a detailed block diagram of the arbitration circuit.

Referring now to FIG. 2, there is illustrated a detailed diagram of the arbiter 10 of FIG. 1. The serial data link 18 on the serial port 19 is connected to a serial/parallel converter 30 which is operable to decode data and addresses from the serial data stream for output of the decoded address on a parallel address bus 32, and to interface the decoded data with a bi-directional data bus 34. Decoded data can be received from the serial data stream on the serial data link 18 and converted to parallel data or, conversely, data can be received from the data bus 34 and converted into a serial data stream for output on the serial data link 18.

The address bus 32 and the address bus 22 are input to an address multiplexer 36. The output of the address multiplexer 36 is connected to the system address bus 16 such that the RAM 12 can be addressed from either the serial data link 18 or the parallel address bus 22. As will be described hereinbelow, the handshake between the serial CPU 28 and the parallel CPU 24 is achieved through the use of a predetermined memory location which is contained within the arbiter 10 in the form of an arbitration byte 38. The address multiplexer 36 is operable to determine if the address on either the address bus 22 or the address bus 32 matches the address location for the arbitration byte 38. When a match exists for either the address on the parallel bus 22 or the address on the parallel bus 32, an arbitration match signal is sent out on a control line 40 to an arbiter control circuit 42. As will be described in more detail hereinbelow, a dual port function is provided that allows either the serial CPU 28 or the parallel CPU 24 to access the arbitration byte 38 regardless of which CPU 24 or 28 has access to the system data bus 14 and system address bus 16.

The data bus 34 and the data bus 20 are connected to a first input/output terminal of a data I/O buffer 44, a second input/output terminal of which is interfaced to the RAM 12 through the system data bus 14. The data I/O buffer 44 is interfaced with the arbiter control 42 through a control line 46 to determine which of the data buses 20 or 34 is to be connected to the system data bus 14 for transfer of data therebetween.

In addition to being interfaced with the I/O buffer 44, each of the data buses 34 and 20 is also interfaced with the arbitration byte 38 to input data thereto and to receive data therefrom, the arbitration byte 38 controlled by the arbiter control 42 through a control line 48. It should be noted that the arbitration byte 38 provides a dual port function. This dual port function allows both data buses 20 and 34 to input data to and receive data from the arbitration byte 38 simultaneously. Therefore, the address location of the arbitration byte 38 can be simultaneously input to the arbiter 10 by both the serial CPU 28 on the serial data link 18 and the parallel CPU 24 on the parallel address bus 22 to either read information from the arbitration byte 30 or input information thereto to provide information to the dual port function.

Since the arbitration byte 38 has a predetermined address associated therewith, this predetermined address is not available for addressing the RAM 12. In the preferred embodiment, the address is either all zeroes or all ones indicating the top address or the bottom address in the address sequence for the RAM. For example, if the address associated with the arbitration byte 38 were all zeroes, this would result in the one byte in the RAM 12 at address ∅∅∅ . . . ∅∅∅ being unavailable for reading or writing.

Figure 3:
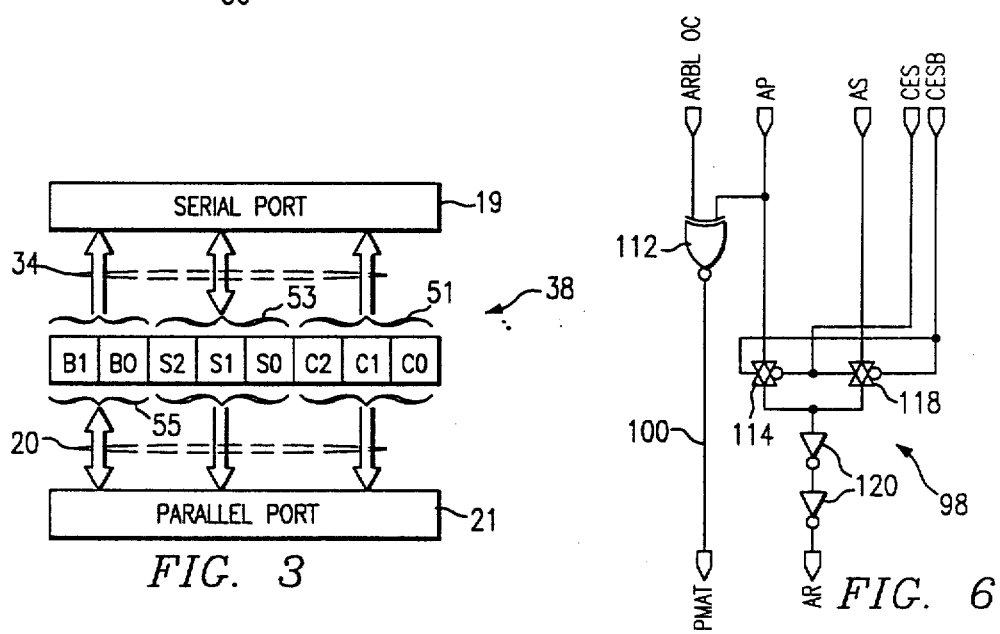
FIG. 3 illustrates a block diagram of the arbitration byte.

Referring now to FIG. 3, there is illustrated a simplified block diagram of the arbitration byte 38 which is interfaced to the serial port 19, and the parallel port 21. The arbitration byte 38 is comprised of eight storage locations for storing an eight-bit word. The eight-bit arbitration byte is divided into three fields, a first three-bit field 51 with data bits C∅, C1 and C2, a second three-bit field 53 with data bits S∅, S1 and S2 and a third data field 55 with data bits B∅ and B1.

The first field 51 is a read only field which can only be read by the serial port 19 and the parallel port 21. This information constitutes system information which can be used to transmit status information, control information, etc. from the arbiter 10 to the serial port 19 and the parallel port 21. The second field 53 comprises serial port information which is written to the arbitration byte 38 by the serial port 19. The information in the second field 53 can be read by either the serial port 19 or the parallel port 21. The second field 53 therefore provides a handshake path between the serial port 19 and the parallel port 21 to allow communication therebetween which sometimes is referred to as baton passing. In a similar manner, the third field 55 is operable to be written to by the parallel port 21 and to be read from by both the serial port 19 and the parallel port 21. This third field allows information to be passed from the parallel port 21 to the serial port 19.

ARBITER OPERATION

There are two modes of operation for the arbiter 10 of the present invention, a simplified mode and an interleaved mode. In the simplified mode, the parallel port 49 writes a "1" to the memory location B1 in the arbitration byte 38 after it has access to the system. The serial port 19 polls the arbitration byte 38 until bit B1 is equal to a "0". The serial port 19 then writes a "1" into the memory location S2 in the second field 53 and then reads the third field 55 to confirm that the bit B1 is still equal to zero In the preferred embodiment, this operation will be executed with a special protocol such that a read status of B1/write status of S2/read status of B1 can occur with only one protocol issued, minimizing the protocol overhead required by the serial port 19 to gain access. When the serial port 19 releases the system port 17, a "0" is written to S2 and the serial port 47 goes back to a condition wherein it polls the status of B1 in the third field 55.

The parallel port 21 in the simplified mode is operable to poll the S2 bit in the second field 53 until the bit S2 is equal to "0". When the bit S2 is equal to "0", the parallel port 21 writes a "1" to the B1 bit and then reads the S2 and B1 bits to confirm that the S2 bit is equal to zero and the B1 bit is equal to "1". If during this confirmation, S2 is a "1", a collision could occur, and therefore, the parallel port 21 then writes a "0" to the B1 bit and returns to the polling mode. However, once the parallel port 21 has gained access, it is allowed to execute Reads and Writes to the RAM 12. When the transaction is completed, the parallel port 21 writes a "0" to the B1 bit. Although this is a simplified scheme, the additional bit B∅ in the field 55 and the additional bits S∅ and S1 in the field 53 allow for additional handshake bits to accommodate a more elaborate handshaking scheme.

In the second mode of operation, interleaving of access is allowed. In this interleaved operation, the parallel port 21 is allowed access to the RAM 12 during the time in which the serial port 19 is accumulating serial data for a Write operation or outputting serial data in a Read operation. During a Write operation, serial data is transmitted to serial port 19 and accumulated until a predetermined number of bits are received. This predetermined number of bits is then transferred in a parallel configuration to the RAM during a very short serial access window. The duration of time for the serial access window is typically much shorter than the time required to accumulate the serial data. In a similar manner, during a Read operation, the data is output from the RAM 12 in a parallel configuration during the serial access window and then serially shifted out of the serial port 19. The time for serially shifting in data or serially shifting out data is a function of a serial clock which typically requires one cycle of the clock for shifting each bit of data in or out of the serial port 19. Depending upon the system, the period of the serial clock is much longer than the access time for the RAM 12. As will be described hereinbelow, the serial port 19 is provided priority at all times, such that when the serial access window occurs, data is either transferred to the RAM or transferred from the RAM. The duration of time between the occurrence of adjacent serial access windows is utilized to serially shift in data or serially shift out data. During this period of time, the parallel port 21 is allowed to access the RAM for Reads and Writes, but is inhibited from accessing the RAM during the serial access window. This constitutes an interleaved operation, wherein data transfer between the RAM 12 and the parallel port 21 occurs outside the serial access window or actual transfer of data between serial port 19 and the RAM 12 occurs.

The interleaved operation allows the parallel port 21, which typically operates at a much higher rate, to access the RAM 12 outside the serial access window. The parallel CPU 24 utilizes the information stored in the first field 51 to determine the relative location in time of the serial access window. These bits C0–C2 indicate a count value representative of the approximate amount of time left before the next serial access window will occur. This provides information to the parallel CPU 24 as to when a Read or Write will occur between the serial/parallel converter 30 and the RAM 12.

In the interleaved mode, neither the status bits B0–B1 or the status bits S0–S2 are required to be written to. The information bits C0–C2 in the first field 51, in the preferred embodiment, are the only information utilized by the parallel CPU 24 to determine when a Read or Write by the parallel port 21 can occur. A full count is indicated when all of the bits C0–C2 are equal to a logic "1" and this corresponds to the time the serial access window is generated. The time required to count from all zeroes to all ones is the amount of time required to load an entire byte of serial data into the serial/parallel converter 30 for transfer to the bus 34 or, conversely, output serial data from the serial port 19 during a Read operation. Therefore, the parallel CPU 24 can determine when the serial access window will occur, thus enabling the parallel CPU 24 to avoid a collision. By having knowledge of when serial access window will occur, the parallel CPU 24 is provided with knowledge of the available access time. It should be noted that this occurs asynchronously with respect to the serial clock.

The parallel CPU 24 determines the available access time by polling the status of the C0–C2 bits. By knowing the frequency of the serial clock associated with the serial CPU 28, the parallel CPU 24 can determine the amount of time left before the serial port accesses the RAM 12. Thus, in the preferred embodiment, the serial CPU 28 is given priority of access to the RAM 12 during the serial access window, and the parallel CPU 24 determines when it can access the RAM 12 to avoid collision with the transfer of data and addresses from the serial CPU 28.

The additional bits B0–B1 and S0–S2 in the third field 55 and the second field 53, respectively, can be used or defined to transfer other information between the two ports. For example, the serial port 19 could transfer information regarding the serial clock frequency to the second field 53 for access by the parallel CPU 24. These additional bits could also indicate the amount of RAM written to, the section into which it was written, etc.

In operation, the interleaved arbitration scheme places bus priority with the serial CPU 28. Initially, a fifty-six bit protocol word is input to the serial port preceded by a reset signal. This protocol word provides information such as whether a Read/Write operation is to be performed, what the starting address is and various other control functions. The clock for loading the protocol word into the serial/parallel converter 30 is provided on the serial data link 18 such that this operation is synchronized with the data rate of the serial data string.

Once the protocol word with the control information is loaded into the arbiter 10, the arbiter 10 then receives serial data from the serial data link 18 during a Write operation, accumulates this data and then outputs it to a parallel bus 34 during the serial access window. The serial access window occurs at the end of each byte of data that is accumulated by the serial/parallel converter 30 during the Write operation. During the Read operation, data is transferred from the parallel bus 34 during the serial access window and then serially transmitted out to the serial data link 18.

The parallel CPU 24 is operable to periodically send out the address for the arbitration byte 38. The presence of this address is detected by the address multiplexer 36 which outputs an arbitration match signal on line 40 to the arbiter control 42 when a match exists. The contents of the first field 51 in the arbitration byte 38 is then output on the bus 20. It should be noted that the arbitration byte 38 is a dual port memory location, and as such, the parallel CPU 24 can access the contents thereof independent of whether the serial CPU 28 or the parallel CPU 24 has access to the RAM 12 through the system port 17.

The parallel CPU 24 evaluates the count value bits C0–C2 to determine when the serial access window will occur, this indicating the end of a byte in the serial data string during a Write or the beginning of a byte during a Read. The count value therefore provides a reference for the parallel CPU 24. The parallel CPU 24 is not synchronized with the clock of the serial CPU 28, and as such, some error is present in determining when the end serial access window occurs. Therefore, the parallel CPU 24 calculates a maximum count value beyond which it will not attempt access to the RAM 12. For example, the maximum count value for the bit C0–C2 is eight. To insure that the parallel CPU 24 does not access the RAM 12 during the access window, the parallel CPU 24 does not attempt access after a count value of six. By providing this time buffer, inhibiting of access by the parallel CPU 24 during the serial access window will be assured. For example, if the parallel CPU 24 determines that the count value is zero, there is no way of knowing whether the count value has been sampled at the beginning of the serial clock cycle or at the end of the clock cycle. This results in an error of one full period of the serial clock. In a similar manner, sampling of the count value at a count value of seven does not provide information as to whether the arbitration byte 30 was sampled at the beginning of the serial clock cycle or at the end. Therefore, by terminating parallel access from the parallel port 21 when the count value is equal to six, this can insure the condition where the count value was sampled at the end of the clock cycle during the generation of the count value of six.

The parallel CPU need only sample the arbitration byte 38 once every eight clock cycles of the serial clock. If the serial CPU 28 ceases to transmit information, the count value is set to all zeroes such that the parallel CPU 24 then knows that it has at least six full clock cycles at the serial clock frequency to access the RAM 12. It is not necessary for the parallel CPU 24 to know whether the serial CPU 28 is communicating with the RAM 12 but, rather, the parallel CPU 24 need only know the approximate location in time of the serial access window.

When the serial CPU 28 initially accesses the arbiter 10, it is important that the operation of incrementing the count value be initiated before the protocol word is completely loaded into the arbiter 10. This is important from the standpoint of a serial Read operation where data is transferred from the RAM 12 immediately upon loading of the protocol word, wherein an address can be output to the RAM 12 and data transferred therefrom for conversion to serial data. Therefore, incrementing of the count value is initiated eight clock cycles prior to completion of loading of the protocol word. This will insure that the parallel CPU 24 can determine when the first access window will occur.

Arbiter

Figure 4:
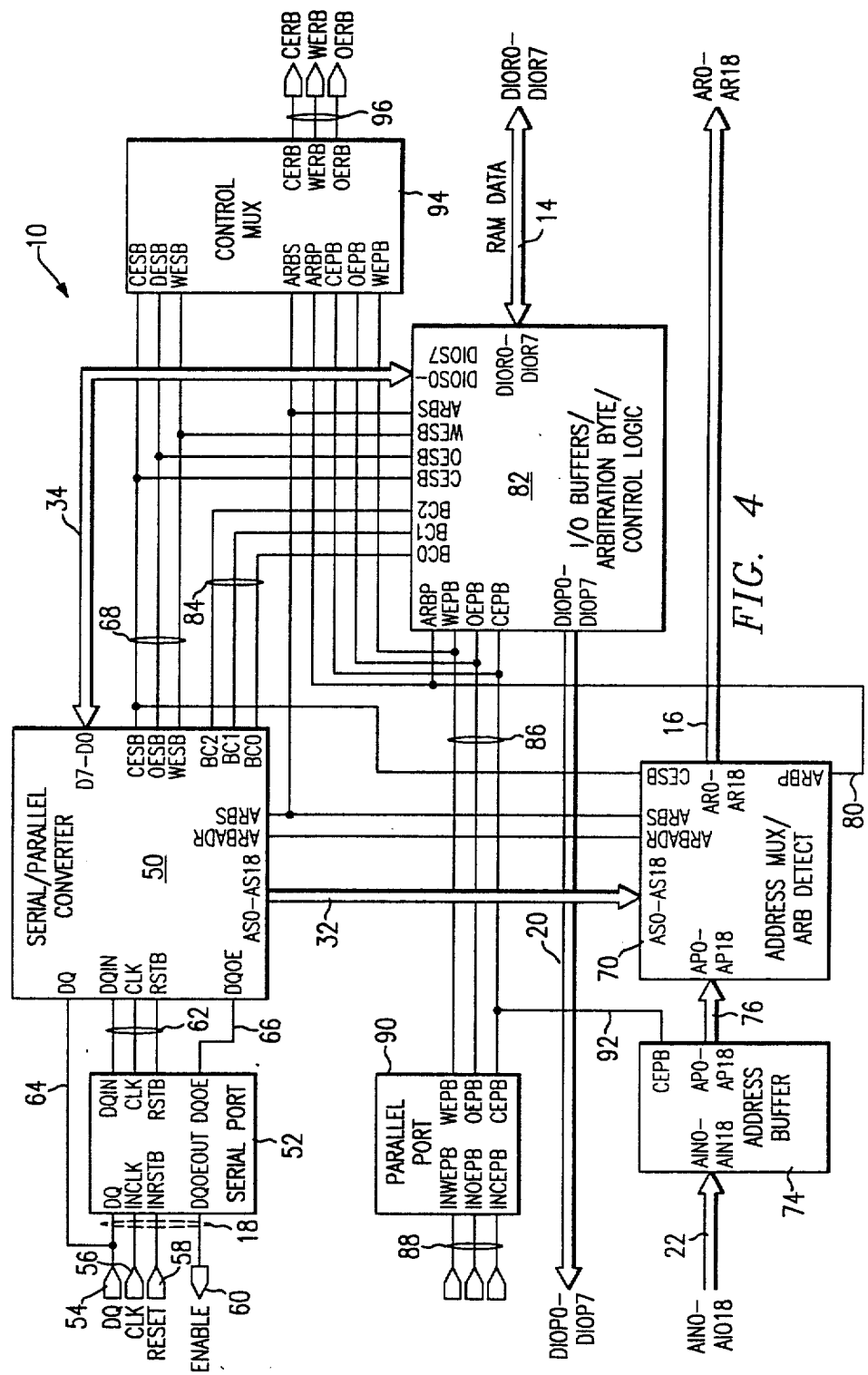
FIG. 4 illustrates a block diagram of the arbitration circuit.

Referring now to FIG. 4, there is illustrated a block diagram of the arbiter 10 of FIG. 2 wherein like numerals refer to like parts in the various figures. The serial/parallel converter 30 of FIG. 2 incorporates a serial/parallel converter 50 and a serial port buffer 52. The serial port buffer 52 is operable to interface with a serial data line 54 for receiving and transmitting data on an input/output DQ, a clock line 56 for receiving a clock signal CLK, a reset pin 58 for receiving a RESET signal and an enable pin 60 for outputting a data Output Enable signal. The serial port buffer 52 is operable to interface with the serial/parallel converter 50 on three lines 62 to input received input data DQIN, the clock signal CLK and a reset signal RSTB to the serial/parallel converter 50. The serial/parallel converter 50 outputs serial data to the data pin 54 on a serial data line 64. A separate Output Enable signal DQOE is transferred from the serial/parallel converter 50 to the buffer 52 on a line 66.

The serial/parallel converter 50 is operable to receive serial data and convert it to parallel data for output on the parallel data bus 34 and receive parallel data therefrom on input data lines D$\emptyset$–D7. In a similar manner, a 19-bit address on address outputs AS$\emptyset$–AS18 is interfaced with the address bus 32. The serial/parallel converter 50 is operable to generate the byte wide count value C$\emptyset$–C2 on the three lines 68 labelled BC$\emptyset$–BC2 and the three control signals representing the serial Chip Enable signal CESB, serial Output Enable signal OESB and serial Write Enable signal WESB. In addition, an output ARBADR is provided representing an arbitration address signal, which signal indicates whether the address of the arbitration byte 38 is all zero's or all one's.

The address multiplexer 36 is represented by an address multiplexer/arbitration detect circuit 70 and an address buffer 74. The address buffer 74 interfaces on the input thereof with the parallel address bus 22 to receive the 19-bit address AIN$\emptyset$–AIN18 for input to the multiplexer/detect circuit 70 on a bus 76. The other parallel input of the multiplexer/detect circuit 70 is connected to the parallel address bus 32 from the serial/parallel converter 50 and the output thereof is interfaced with the system address bus 16. The multiplex/detect circuit 70 receives the signals ARBADR, CESB and ARBS from the serial/parallel converter 50 for input thereto.

The multiplexer/detect circuit 70 is operable to provide a multiplexing operation for routing either the address on bus 32 or the address on bus 22 to the system address bus 16. Additionally, the multiplex/detect circuit 70 is operable to determine whether either of the address buses 22 or 32 have present thereon the address of the arbitration byte 38. If the address of the arbitration byte 38 is on bus 32, representing an address from the serial data link 18, a match is determined and a signal ARBS output on a line 78 and, if the address of the arbitration byte 38 is present on the bus 22, a signal ARBP is output on a control line 80. It should be noted that the detection of the arbitration address is independent of the multiplexing operation such that this detection takes place before the multiplexing operation. The output CESB is provided to allow the serial port to have priority over the parallel port, as will be described in more detail hereinbelow.

The arbitration byte 38 and the arbiter control 42 are contained in an I/O buffer/arbitration byte control circuit 82 which has three parallel data ports connected to the bus 20, the bus 34 and the system data bus 14, respectively. The control circuit 82 provides direction control logic and a storage location for the arbitration byte 38. The control circuit 82 receives the count value of C$\emptyset$–C2 from the serial/parallel converter 50 on lines 84 and the serial port control signals CESB, OESB and WESB on lines 68. The arbitration match signals ARBP and ARBS on lines 78 and 80 are also input thereto in addition to parallel port control signals WEPB, OEPB and CEPB, representing the Write Enable, Output Enable and Chip Enable signal, respectively, on lines 86. The lines 86 are interfaced with input control lines 88 from the parallel port through parallel port control buffers 90. The Chip Enable signal is output from the parallel port control buffers 90 and is also input to the address buffers 74 through a line 92.

The Chip Enable, Output Enable, and Write Enable signals for both the parallel and the serial ports on the lines 68 and 86, respectively, are input to a control multiplexer 94 in addition to the parallel and serial arbitration match signals ARBP and ARBS on lines 78 and 80. The control multiplexer 94 outputs the control signals CERB, WERB, OERB, representing the system Chip Enable, Write Enable, and Output Enable signals respectively, for input to the RAM 12 on lines 96.

Address Mux/Detect Circuit

Referring now to FIG. 5, there is illustrated a block diagram of the multiplexer/detect circuit 70 of FIG. 4, wherein like numerals refer to like parts in the various figures. The address buses 22, 32 and 16 are each nineteen bits wide with each of the address lines therein associated with a separate address multiplexer/detect circuit 98. Each of the address multiplexer/detect circuits 98 has a parallel address input AP for being associated with the respective address line in the bus 22, and a serial input address AS for being connected to the associated address line in the bus 32. The address line of the bus 16 associated therewith is connected to an output label AR. Each of the address multiplexer/detect circuits 98 also provides a match detect function for the parallel port by comparing the received bit on the input AP and outputting the match signal on the output line 100 representing a parallel match output PMAT. The arbitration address signal ARBADR is input directly to an input labelled ARBLOC. In a similar manner, the signal CESB is input to one input of an OR gate, the other input connected to the ARBS signal, which signal indicates access to the arbitration byte 38 from the serial port 19. The output of OR gate 104 is input to each of the address multiplexer/detect circuits 98 in addition to the non-inverted form thereof through an invertor 106. If either CESB or ARBS is a "1", then the parallel port addresses are selected, otherwise serial port addresses are selected.

Each of the parallel match output signals PMAT on line 100 are input to a compare circuit 108, the output of which represents the ARBP match signal on line 80. The compare circuit 108 is comprised of an AND function that requires the presence of a predetermined logic state on all of the lines 100 in order to provide a true compare signal on the output line 80. Although not shown, the compare circuit 108 is comprised of a plurality of multiple input NAND gates and NOR gates. However, it should be understood that any logic function which provides a compare function that requires the presence of a predetermined logic state on all nineteen of the output lines 100 will provide the appropriate function.

Figure 6:
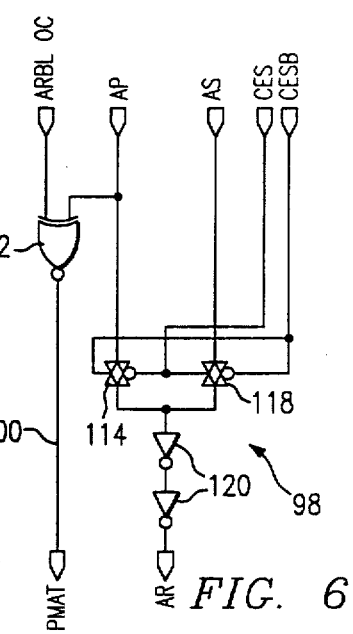
FIG. 6 illustrates a block diagram of the address multiplexer for a single address line.

Referring now to FIG. 6, there is illustrated a detailed logic diagram of one of the address multiplexer/detect circuits 98. The parallel address line on the AP input is input to one input of an Exclusive NOR gate 112 and also to the input of a transfer gate 114. In a similar manner, the serial address line on the input AS is input to one input of an Exclusive NOR gate 116 and also to the input of a transfer gate 118. The other input of both of the Exclusive NOR gates 112 and 116 are connected to the arbitration address input ARBLOC. The outputs of transfer gates 114 and 118 are connected to the AR output through two series connected invertors 120. The Exclusive NOR gates 112 and 116 provide a matching function to output a logic "1" when both inputs are either a logic "0" or a logic "1".

The transfer gates 114 and 118 are controlled by the signal CESB which represents the inverse of the signal CES. When CES is high, the transfer gate 118 connects the AS input to the AR output and the transfer gate 114 inhibits transfer of the input AP to the output AR. Conversely, when CES is low, the AP input is connected to the AR output and the AS input is disconnected from the AR output. Therefore, the presence of the CES signal controls the multiplexing function such that the serial port has priority. As will be described hereinbelow, this occurs only after loading of internal shift registers with the serial data to convert it to parallel data and address information for output on the address bus 32 and the data bus 34, respectively. This occurs during a very short duration access window.

Serial/Parallel Convertor

Figure 7:
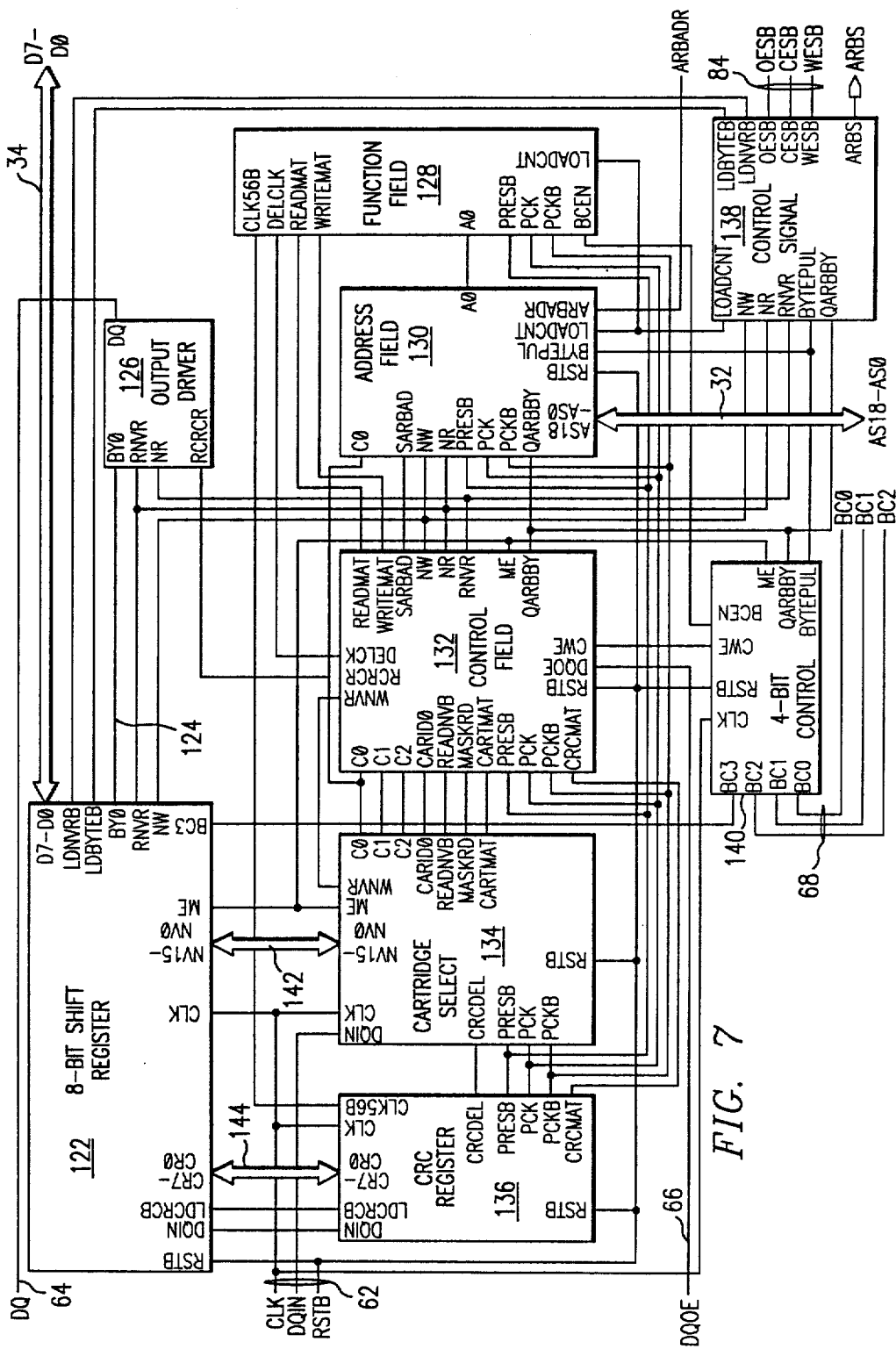
FIG. 7 illustrates a block diagram of the serial to parallel converter.

Referring now to FIG. 7, there is illustrated a block diagram of the serial/parallel converter 50 of FIG. 4, wherein like numerals refer to like parts in the various figures. The DQIN input from lines 62 is input to an eight-bit shift register 122 which is operable to receive on the input thereof serial data and convert it to parallel data for output on bus 34 through outputs D0–D7. Conversely, on a Read operation, data is received on the parallel data inputs D0–D7 and collected in the shift register for shifting out on an output BY0 to an output line 124. The output line 124 is connected to the input of an output driver 126 which is connected to the DQ output line 64. The eight-bit shift register is clocked by the CLK signal and reset by the RSTB signal from the lines 62. Therefore, after a Read or Write function is determined, data can be sequentially input to the eight-bit shift register 122 during the Write operation and then output on the data bus 34. As will be described hereinbelow, an initial address is input to the serial/parallel converter and then this address internally incremented such that only a continuous stream of data is transferred thereafter.

Protocol Shift Register

Initially, after a reset signal is received, a protocol word comprising a fifty-six bit string of data is input to the serial/parallel converter 50 to provide a function field, address field, a control field, an identification (ID) field and an error check field. The function field is collected in a function field block 128 which is operable to determine whether a Read or Write operation will occur, and is comprised of the first eight bits of the protocol word. The address information is stored in an address field block 130 which stores the next nineteen bits of the protocol word to determine the initial address. The control field is comprised of the next five bits of the protocol word which are stored in a control field block 132. This determines the specific type of Read or Write operation that will occur. The ID field is comprised of the next sixteen bits of the protocol word and is stored in a cartridge select block 134, and provides the function of comparing the sixteen bit ID with an internally stored reference and then outputting a match signal if the ID is correct. Error checking is provided through a cyclical redundancy check scheme and is provided by the next eight bits of the protocol word in a CRC register circuit 136. The function block 128, address field block 130, control field block 132, cartridge select block 134, and CRC register 136 are arranged in a serial fashion such that the protocol word is input to the CRC register 136 until all fifty-six bits are serially loaded through the CRC registers and the remaining circuitry until the first eight bits input thereto reside in the function field block 128. This circuitry comprises a protocol shift register. After completion of loading into the protocol shift register, the appropriate operation is selected and data either read from the RAM 12 or written thereto during the access window. The operation of each of these registers will be described hereinbelow.

Referring further to FIG. 7, the general operation of each of the fields in the protocol shift register will be described. The function field block 128 as described above, is operable to provide a signal that will indicate if a Read or a Write operation is to occur. In addition, the function field circuit 128 determines when the end of the fifty-six bit protocol word is loaded into the protocol shift register. When the fifty-sixth bit is loaded in, a signal is output on a line CLK56B for input to the CRC register 136 to inhibit further loading of data in the internal registers therein. Since data is continuously loaded in through the DQIN line, it is necessary to inhibit further shifting of data through the protocol shift register. A global protocol RESET input PRESB is provided for resetting the entire protocol shift register with a protocol clock and the inverse thereof represented by signals PCK and PCKB, respectively, provided for generating the clocking signal for shifting data through the protocol shift register.

As described above, the data field for the function field block 128 is eight bits wide. Within these eight bits is encoded a Read instruction or a Write instruction. The function field block 128 determines whether the Read instruction is present or the Write instruction is present. If the Read instruction is present, a signal is output on a READMAT line, and if a Write instruction is present, a signal is output on a WRITEMAT line, both lines being input to the control field block 132. The serial input to the function field block 128 is received on an A∅ input.

When the last bit of the protocol word is loaded into the protocol shift register, the clock is delayed by a predetermined amount of time to allow the information to be examined and the proper functions to be output. This signal is output on a line DELCLK when put to the control field block 132. In addition, a pulse is generated at the end of the loading operation for the protocol shift register and output on a line LOADCNT, which signal is input to the address field block 130 and to a control signal block 138. The LOADCNT signal indicates the end of the loading operation for the protocol shift register and enables the address stored in the address field block 130 to be loaded into an internal counter therein. A signal BCEN is provided for output from the function field block 128 to the input of a four-bit counter 140 to initiate the count thereof. The signal BCEN is generated eight clock cycles prior to completion of the loading of the protocol shift register such that the count bits BC∅-BC2 that are stored in the arbitration byte 38 reflect a count value that can be examined by the parallel port. This is necessary during interleaved operation in order to allow the parallel port to determine if the serial port is active when the initial serial operation is a Read. On a Read operation, the initial address is immediately output from the address field block 130 at the end of loading the protocol word. This allows transfer of data from bus 34 to the eight-bit shift register 122 and serial output on the DQ data line 64 on the falling edge of the next eight clock cycles of the serial clock. The parallel CPU 24 needs to know that the transfer of data from RAM 12 will occur at the end of the protocol word loading operation. Incrementing of the bits C∅-C2 in the arbitration byte 38 eight cycles prior to completion of the protocol shift register loading operation provides this information.

The address field block 130 is comprised in part of a serial shift register for storing a nineteen-bit address for parallel output to an internal counter. The counter is operable to be loaded by the LOADCNT signal and then output the contents thereof to the address bus 32. The counter is then operable to be incremented at the end of every byte by a signal BYTEPUL. The internal counter can only be incremented in the presence of a normal Read signal NR or a normal Write signal NW indicating a Read or Write operation. Further, there is another function providing for a compressed READ/WRITE/READ operation wherein the arbitration byte is queried. A control signal QARBBY provides this query, and during the query, incrementing of the counter is inhibited. This occurs whenever the serial port is examining the contents of the arbitration byte 38 such that the contents of the internal counter are not disturbed. The SARBAD signal (set arbitration address signal) is an input signal from the control field block 132 that determines the setting of the arbitration address to all zeroes or all ones.

The control field block 132 receives a five-bit control field, which field is decoded to provide the various control signals in addition to receiving signals from the other blocks in the protocol shift register for decoding thereof. The control field block 132 generates the NW and NR signals for the normal Read and Write operation after it is determined that there is a Read and Write match from the function field block 128. Additionally, the control field block 132 is operable to control the Read and Write operation to the cartridge select block 134 and also the Read operation of the CRC register 136. To write to the cartridge select block 134, a Write command WNVR is operable to control the cartridge select block 134 to connect an internal nonvolatile memory to the DQIN line. Thereafter, the next sixteen bits input thereto are stored as an internal identification code. In another mode, it may be desirable to read the contents of the nonvolatile memory in the cartridge select block 134. The RNVR signal is then generated and the contents of the nonvolatile memory are loaded in two groups of eight bits each onto the parallel port of the eight-bit shift register 122 for output through the output driver 126 on the next sixteen clock cycles.

The contents of a CRC register 136 are controlled by a signal RCRCR which is input to the output driver 126. The CRC register 136, as will be described hereinbelow, contains a serial shift register that is eight bits wide which is disposed in serial with the protocol word. At the end of a Read or Write operation, the contents of the CRC register 136 are automatically loaded into the eight-bit shift register 122 and, if it is desirable to read this information, another command sequence is issued that generates the RCRCR signal is generated and the contents of the eight-bit shift register 122 are shifted out through the output driver 126 to the DQ line 64.

A signal DQOE is generated representing the Output Enable signal for a Read operation on line 66. This is utilized in a four wire system wherein the serial CPU 28 requires status information to enable it to tri-state its transmit/receive port such that it is ready to receive data from the arbiter 10.

A cartridge match signal (CARTMAT), a CRC match signal (CRCMAT) and the delayed clock signal (DELCLK) are all received and utilized to generate a Master Enable signal (ME). This is an indication that the protocol shift register is loaded and ready, that the CRC register 136 provides a match, the ID matches in the cartridge select block 134, and a valid command has been received.

The control field block 132 also decodes a signal CWE for compressed Write Enable and a signal MASKRD for a Masked Read function. Outputs C∅, C1 and C2 constitute the least significant bit and the following two bits of the control field. These are utilized in the Masked Read operation, which bits are decoded in the cartridge select block 134. A signal READNVB is provided for output to the cartridge select block 134 when the nonvolatile memory containing the prestored ID is read. This signal forces the CARTMAT signal to a high, indicating that there is an ID match in the cartridge select block 134. Otherwise, operation would be inhibited and no Master Enable signal ME would be generated. The input to the control field block 132 is the CARID∅ input.

The cartridge select block 134 has an internal storage register referred to as a nonvolatile memory which is interfaced with the eight-bit shift register 122 on the parallel input thereto through a bus 142 to allow data stored therein to be read out. Additionally, the cartridge select block 134 contains a sixteen-bit shift register which is a portion of the fifty-six bit protocol word and is operable to store the identification code that is to be compared with the contents of the nonvolatile memory. A true comparison results in a high logic signal on the CARTMAT output. A DQIN input is provided for interfacing the input of the internal nonvolatile memory with the DQIN input pin on line 62, whereas the internal shift register has the input thereof connected to the CRCDEL output of the CRC register 136. Therefore, the cartridge select block 134 is operable to have the nonvolatile memory therein written to or read from, and also receive the sixteen-bit cartridge match field for comparison with the ID stored in the internal nonvolatile memory.

The CRC register 136 is operable to receive the eight-bit CRC field in the fifty-six bit protocol word and process this information in accordance with a predetermined cyclic redundancy check algorithm to determine if there is a match, which signal is output on the CRCMAT line. In addition, the contents of the register can be read out to the parallel input of the eight-bit shift register 122 on a bus 144, as described above.

The control signal block 138 is operable to output the Output Enable signal, Chip Enable signal and Write Enable signal at the end of each byte of data. During operation wherein data is being read from the memory, a BYTEPUL signal is generated by the four-bit counter 140 at the beginning of each byte to load the eight-bit shift register 122. During a Write, BYTEPUL signal is generated at the end of each byte to indicate the eight-bit shift register 122 as being full. This pulse, in conjunction with the NR and NW signals, results in the generation of the signals on the system control lines 84 for enabling data transfer. In addition, the control signal block 138 outputs loading signals to the eight-bit shift register 122 to enable the eight-bit shift register 122 to load data in from the cartridge select block 134 or the data bus 34. The load signal LDNVRB is generated when the contents of the nonvolatile memory in the cartridge select block 134 are to be loaded into the eight-bit shift register 122 and a load signal LDBYTEB is generated when the data on the data bus 34 is to be loaded into the eight-bit shift register 122.

During operation of the control signal block 138, it is important during a Read operation that the information from the RAM 12 be transferred into the eight-bit shift register 122 prior to serially shifting out data of the first full byte from shift register 122. Therefore, the signal LOADCNT is utilized by the control signal block 138 to load the initial value of data into the eight-bit shift register 122 immediately after the protocol word is loaded. Thereafter, the BYTEPUL signal controls loading.

In operation, the fifty-six bit protocol word is first loaded into the protocol shift register. When the protocol word is loaded, the control field block 132 determines if the CARTMAT output, indicating an ID match, and the CRCMAT signal, indicating no errors, are both high. After the predetermined amount of delay provided by the DELCLK signal, the Master Enable signal ME is then generated which enables the eight-bit shift register 122 and the four-bit counter 140 to allow reading or writing of data from the RAM 12. The Read or Write function is first determined by the function field block 128 and then the address loaded into the internal counter in the address field block 130. This address is then output therefrom to the address multiplex/detect circuit 70 for input to the RAM 12. This is in response to the LOADCNT signal. At the same time, data on the data bus 34 is loaded into the eight-bit shift register 122 on a Read operation and then output through the output driver 126 to the DQ line 64. On a Write operation, the eight-bit shift register 122 is first loaded and then shifted out to the data bus 34 in response to generation of the BYTEPUL signal by the four-bit counter 140. This continues until the Read or Write function is completed. During this time, the four-bit counter 140 generates the count value BC∅-BC2 on the line 68 for input to the arbitration byte 38.

CRC Register

Figure 8:
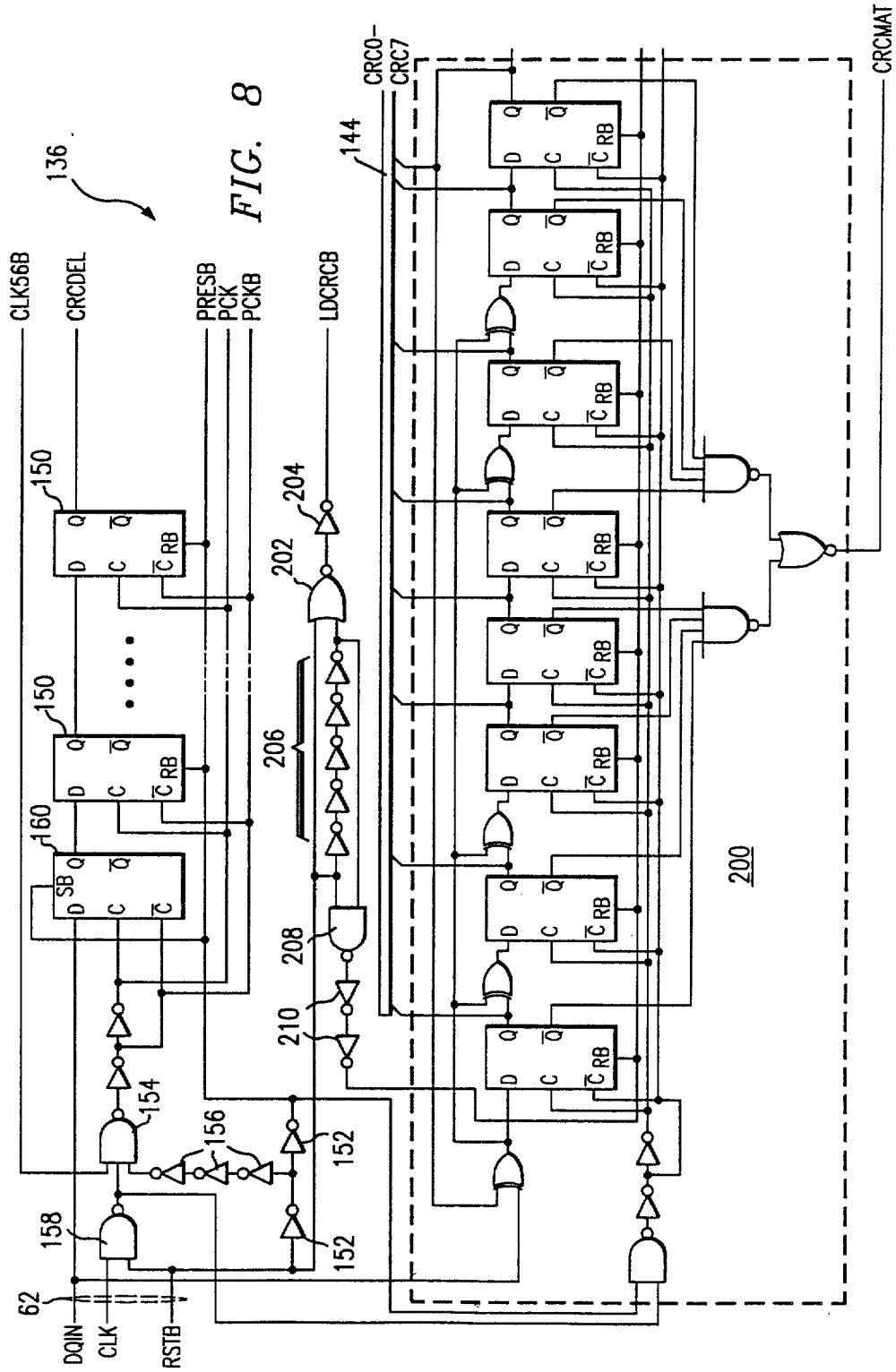
FIG. 8 illustrates a logic diagram of the CRC register.

Referring now to FIG. 8, there is illustrated a logic diagram of the CRC register 136, wherein like numerals refer to like parts in the various figures. An eight-bit shift register is provided with seven serially connected D-type flip flops 150, each flip flop 150 having the input thereof connected to the Q-output of the previous flip flop in the string. The Q-output of the final flip flop 150 in the shift register provides the CRCDEL signal for input to the cartridge select block 134.

The reset input of the flip flops 150 are all connected together and to the RSTB signal on line 62 through two invertors 152. The clock and clock-bar inputs are connected to the output of a three input NAND gate 154, one input of which is connected to the CLK56B signal, one input of which is connected through three invertors 156 and one of the invertors 152 to the RSTB input and the other input of which is connected to the output of a two input NAND gate 158. The NAND gate 158 has one input thereof connected to the CLK signal and the other input thereof connected to the RSTB signal. The NAND gate 158 and the NAND gate 154 provide a clock signal which is inhibited upon the generation of the CLK56B signal indicating the end of a loading operation for the protocol shift register. Therefore, the clock operates only in the presence of a high on the CLK56B line and a logic high on the RSTB line. The reset signal PRESB, the clock signal PCK and the inverse thereof are generated by the gating circuit comprised of the NAND gates 154 and 158 and the invertors 152 and 156.

The input to the first flip flop 150 in the eight-bit shift register is connected to the Q-output of a D-type flip flop 160. In the protocol shift register, the Q-output of the flip flop 160 is connected to the D-input of the first flip flop 150 in the shift register and the D-input of the flip flop 160 is connected to the DQIN terminal. When the flip flops 150 are reset to zero on the reset input thereof, the flip flop 160 is set to a logic "1" with the set input thereof being connected to the reset inputs of the flip flops 150 and to the reset signal RSTB through invertors 152. Therefore, upon loading of the protocol shift register, a "1" is always pushed through the shift register. The CLK56B signal is generated when this "1" is detected at the end of the field.

The CRC error detection function is provided by a circuit 200 that determines whether there are any errors in accordance with a predetermined cyclical redundancy check algorithm. The circuit 200 provides a parallel output of the contents thereof on a bus 144 for output to the eight-bit shift register 122.

The LDCRCB signal is provided with a pulse generating circuit comprised of a two-input NOR gate 202 disposed in series with an invertor 204, one input of the NOR gate 202 connected to the RSTB signal and the other input thereof connected to the RSTB signal through five series-connected invertors 206. The pulse is generated on the falling edge of the RSTB signal. The output of the series connected invertors 206 is also input to one input of a NAND gate 208, the input of which is connected to the signal RSTB and the output of which is connected through two series-connected invertors 210 of the circuit 200 to provide a pulse on the rising edge of the RSTB signal to reset the CRC circuit 200 prior to sending the first bit of the protocol.

Cartridge Select Block

Figure 9:
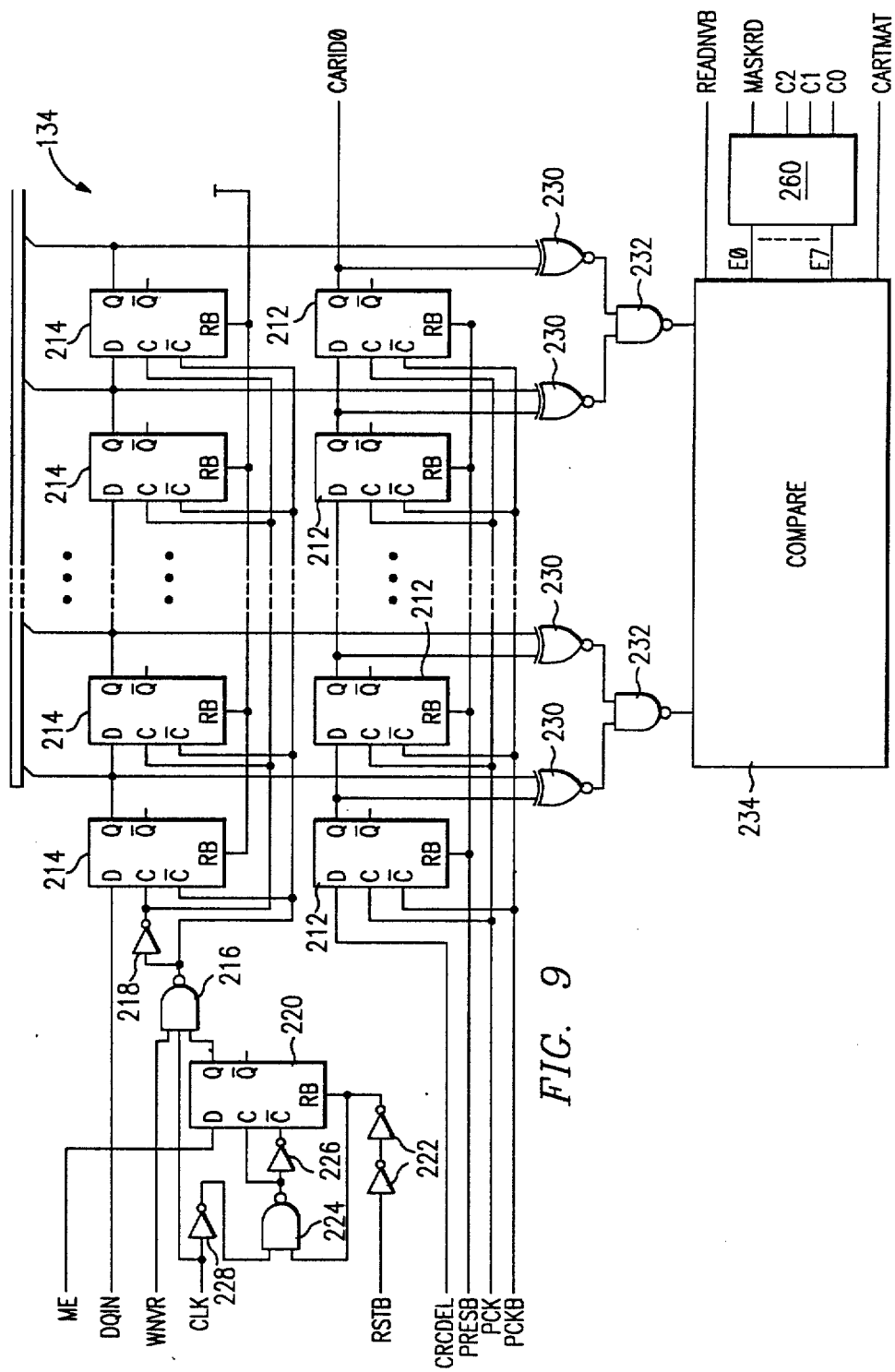
FIG. 9 illustrates a logic diagram of the cartridge select block.

Referring now to FIG. 9, there is illustrated a logic diagram of the cartridge select block 134, wherein like numerals refer to like parts in the various figures. The cartridge select block 134 is comprised generally of a sixteen-bit serial shift register disposed between the input CRCDEL and the output CARID∅. The shift register is comprised of sixteen individual D-type flip flops 212, each having the D-input thereof connected to the Q-output of the previous flip flop 212. The clock input is connected to the PCK input and the clock-bar input is connected to the PCKB input with the reset input connected to PRESB. The first flip flop 212 in the shift register has the D-input thereof connected to the CRCDEL input and the last flip flop 212 in the shift register has the Q-output thereof connected to the CARID∅ output.

The cartridge select block 134 also contains a sixteen-bit nonvolatile register comprised of D-type flip flops 214. Each of the flip flops 214 has the D-input thereof connected to the Q-input of the previous flip flop and the D-input of the most significant bit (MSB) connected to the DQIN input. The reset input of each of the flip flops 214 is connected to a positive voltage. The clock input of each of the flip flops 214 is connected to the output of a NAND gate 216 through an invertor 218, and the clock-bar input of each of the flip flops 214 is connected to the output of the three input NAND gate 216. The NAND gate 216 has one input thereof connected to the WNVR input associated with the Write Nonvolatile Memory command, the second input thereof connected to the CLK input which, as described above, is the system clock that is not inhibited in the CRC register 136, and the third input thereof connected to the Q-output of a D-type flip flop 220. The D-input of flip flop 220 is connected to the Master Enable signal ME with the reset input thereof connected through two invertors 222 to the RSTB input. The clock input of flip flop 220 is connected to the output of a two input NAND gate 224 and the clock-bar input thereof is also connected to the output of NAND gate 224 through an invertor 226. One input of NAND gate 224 is connected to the output of the invertors 222 and the other input thereof is connected through an invertor 228 to the CLK signal. In operation, the CLK signal is inhibited from passing through the NAND gate 216 until both the WNVR signal is generated and the ME signal is generated. The flip flop 220 is operable to clock the ME signal through on the rising edge of the CLK signal. In this manner, the contents of the nonvolatile memory stored in the flip flops 214 is protected until the WNVR signal and the ME signal are generated. At that time, data can be shifted in from the DQIN input into the flip flops 214 to provide the predefined identification code that is stored in a cartridge select block 134 for later comparison to the received identification code.

The Q-outputs of each of the sixteen flip flops 214 is connected to one output line of the bus 142 labelled NV∅ through NV15. These output lines are arranged such that the first eight bits associated with lines NV∅–NV7 are selectively interfaced with the eight inputs of the eight-bit shift register 122. Thereafter, the next eight bits associated with output lines NV8–NV15 are interfaced with the same eight bits in the eight bit shift register 122. Since there are sixteen bits, when reading the nonvolatile memory, it is necessary to first load the eight bits associated with outputs lines NV∅–NV7 into the eight-bit shift register 122 and then transfer them out of the shift register 122 followed by loading in of the next eight bits associated with output lines NV8–NV15. This operation will be described hereinbelow with reference to the detailed operation of the eight-bit shift register 122.

The Q-output of each of the flip flops 214 is input to one input of an Exclusive NOR gate 230, the other input of the Exclusive NOR gate 230 being connected to the Q-output of the associated one of the flip flops 212 in the serial shift register. If both of the bits match, the output of the Exclusive NOR gate 230 is a logic "1" to indicate a match. Thereafter, the outputs of the Exclusive NOR gates 230 for each of the associated flip flops 212 in the serial shift register and the flip flops 214 in the nonvolatile register are compared to determine if there is a match in all sixteen bits. In the preferred embodiment, adjacent bits have the outputs of the associated Exclusive NOR gates 230 connected to the inputs of a two-input NAND gate 232, the output of which is connected to the input of a compare circuit 234. This results in reduction of the input to the compare circuit 234 to eight. Compare circuit 234 utilizes combinatorial logic to determine if eight logic lows are present on the eight outputs of the NAND gates 232. The compare circuit 234 also receives the READNVB input which is utilized to force the CARTMAT signal to a logic high during reading of the nonvolatile memory comprised of flip flops 214.

The cartridge select block 134 also provides for a Masked Read function which is utilized to determine a match on only two of the bits at a time. This is utilized to determine in a very short amount of time if a given ID exists on one of a plurality of devices utilizing the cartridge select logic block 134. By loading the ID into all of the devices and then only comparing two bits, and then four bits, six bits, eight bits, ten bits, twelve bits, fourteen bits, sixteen bits, it can easily be determined which IDs are in the system by exhaustively searching all four combinations of two bits, fixing those two bits, and searching all four combinations of the next two bits, etc. This results in a much faster elimination process.

The Masked Read operation utilizes the three least significant bits C∅, C1 and C2 in the control field, which bits are input to an enable decode circuit 260 which outputs enable signals E∅–E7. Enable signals E∅–E7 are operable to force the compare circuit 234 to a match condition for one to seven of the eight outputs of NAND gates 234 such that one pair to seven pairs of bits is examined.

Control Field Block

Figure 10:
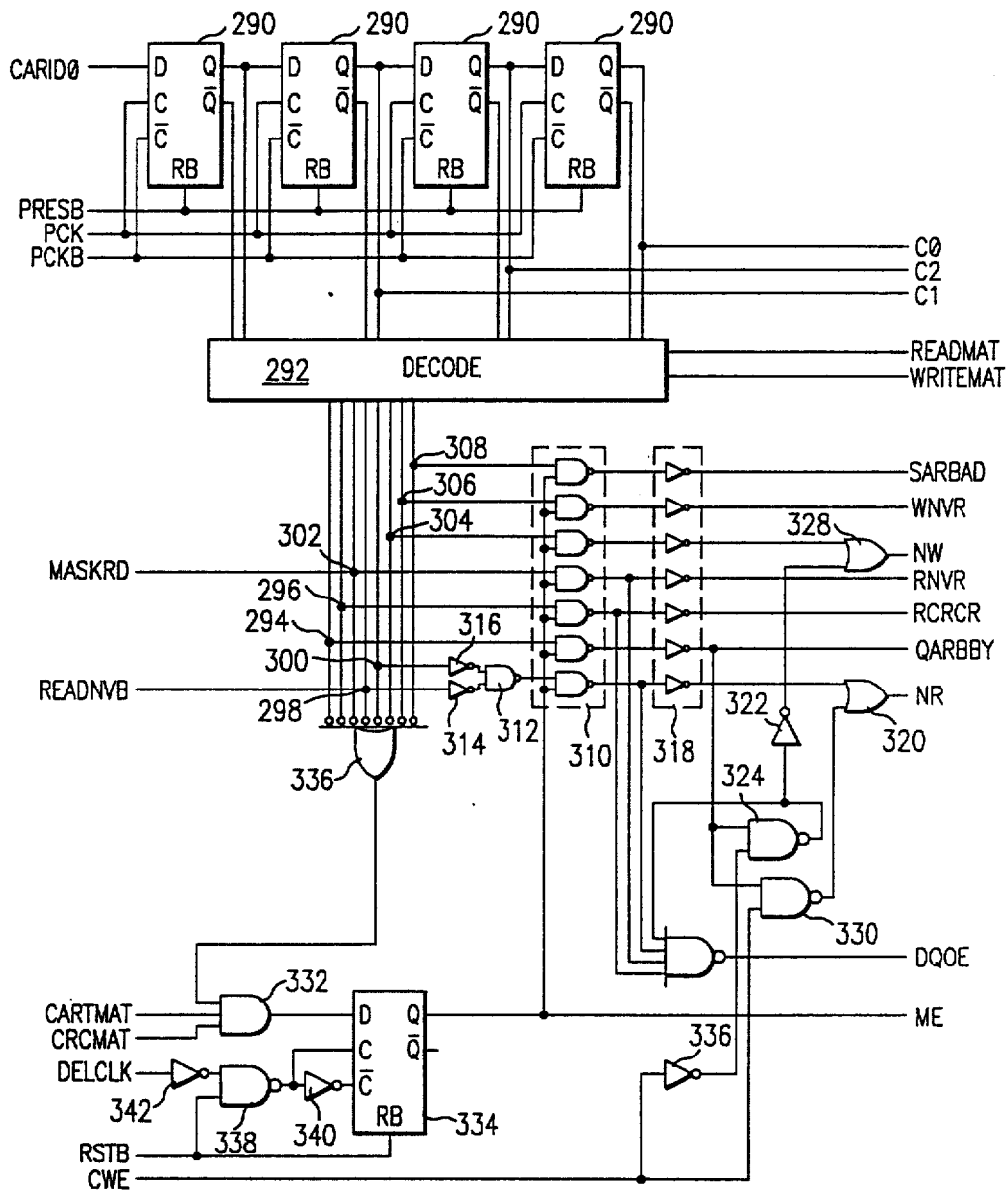
FIG. 10 illustrates a logic diagram of the control field block.

Referring now to FIG. 10, there is illustrated a logic diagram of the control field block 132 in the protocol shift register. The control field block 132 is generally comprised of five D-type flip flops 290, each having the D-input thereof connected to the Q-output of the preceding flip flop in the shift register string with the D-input of the first flip flop 290 comprising the most significant bit and having the input thereof connected to the CARID∅ input and the last flip flop 290 in the shift register comprising the least significant bit and having the Q-output thereof connected to the C∅ output terminal. The clock input of each of the flip flops 290 is connected to the PCK input with the clockbar input thereof being connected to the PCKB input. The resets of all of the flip flops 290 are connected to the PRESB input. The Q-outputs comprise the control bits C∅–C4.

The Q- and Q-bar outputs of flip flops 290 for the bits C∅–C4 are input to a decode block 292 which is operable to generate eight decoded outputs corresponding to eight separate commands. Each of these commands is determined by the contents of the control field. The READMAT and WRITEMAT signals from the function field block 128 are input to the decode block 292 as two additional signals for the decode function provided by the decode block 292. The eight outputs are labelled with reference numerals 294 through 308. The output 294 corresponds to the compressed READ/WRITE/-READ operation, the output 296 corresponds to the Read operation for the CRC register 136, the output 298 corresponds to the Masked Read operation, the output 300 corresponds to the Normal Read operation, the output 302 corresponds to the reading of the nonvolatile register in the cartridge select block 134, the output 304 corresponds to the Normal Write operation, the output 306 corresponds to the Write operation for the nonvolatile register in the cartridge select block 134 and the output 308 corresponds to the operation to set the arbitration address (SARBAD).

Each of the outputs 294, 296 and 302–308 are input to one of seven NAND gates 310 with the outputs 298 and 300 each input to one of two inputs on a NAND gate 312 through invertors 314 and 316, respectively. The output of NAND gate 312 is input to the last of the NAND gates 310. The other inputs of the NAND gate 310 are connected to the Master Enable signal ME such that the output of NAND gates 310 requires the presence of ME to generate the commands. However, the Masked Read signal MASKRD and the READNVB signal do not require gating by the Master Enable signal.

Each of the outputs of the NAND gates 310 are inverted through a bank of invertors 318, with the invertor 318 associated with output 308 providing the SARBAD signal, the invertor 318 associated with the output 306 providing the WNVR signal, the invertor 318 associated with the output 302 providing the RNVR signal, the output of invertor 318 associated with the output 296 providing the RCRCR signal and the invertor 318 associated with the output 294 providing the QARBBY signal. The output of the invertor 318 associated with the output of NAND gate 312 is input to one input of an OR gate 320, the other input of which is connected through an invertor 322 to the output of an NAND gate 324. The NAND gate 324 has one input thereof connected to the QARBBY output and the other input thereof connected through an invertor 326 to the Compressed Write Enable output (CWE). In a similar manner, the invertor 318 associated with the output 304 is input to one input of an OR gate 328, the other input of which is connected to the output of an NAND gate 330. The NAND gate 330 has one input thereof connected to the QARBBY signal and the other input thereof connected to the CWE signal. The output of OR gate 320 provides the normal Read signal NR and the output of the OR gate 328 provides the normal Write signal NW. The logic functions for the signals in the various control fields are illustrated in Table I as a function of the five-bit control field C∅–C4.

TABLE I

| COMMAND | LOGIC FUNCTION |
|---------|----------------|
| SARBAD | WRITE*10110*ME |

TABLE I-continued

| COMMAND | LOGIC FUNCTION |
|---------|----------------|
| WNVR | WRITE*01110*ME |
| NW | WRITE*10001*ME or CWE*ME |
| RNVR | READ*00101*ME |
| NR | READ*00110 or READ*11XXX*ME or CWE-BAR*ME |
| RCRCR | READ* 00011*ME |
| QARBBY | WRITE*01001*ME |
| READNVB | READ*00101 |
| MASKRD | READ*11XXX |

The signals CARTMAT and CRCMAT are input to one input of a three input AND gate 332, the output of which is connected to the D-input of a D-flip flop 334. The remaining input of the AND gate 332 is connected to the output of an eight-input OR gate 334. Each of the inputs of the OR gate 336 is connected to an associated one of the outputs 294–308 of the decode circuit 292. The OR gate 336 is operable to have the output thereof disposed at a logic high in the presence of at least one valid command. If at least one valid command is not present, the output of OR gate 336 is low and AND gate 332 will be inhibited such that the D-input to flip flop 334 is low. The clock input to the flip flop 334 is connected to the output of a NAND gate 338 and the clock-bar input is connected to the output of NAND gate 338 through invertor 340. The NAND gate 338 is connected on one input through an invertor 342 to the DELCLK signal and the other input thereof is connected to the RSTB signal and also connected to the reset input of the flip flop 334. In operation, when the input signals CARTMAT and CRCMAT are valid and a valid command is present in the control field, the Master Enable signal is generated on the rising edge of the DELCLK signal after the appropriate command is generated. It is important to note that the READNVB and MASKRD signals are generated prior to generation of the ME signal. In addition, the first three bits C∅–C2 are output to the cartridge select block 134.

Address Field Block

Figure 11:
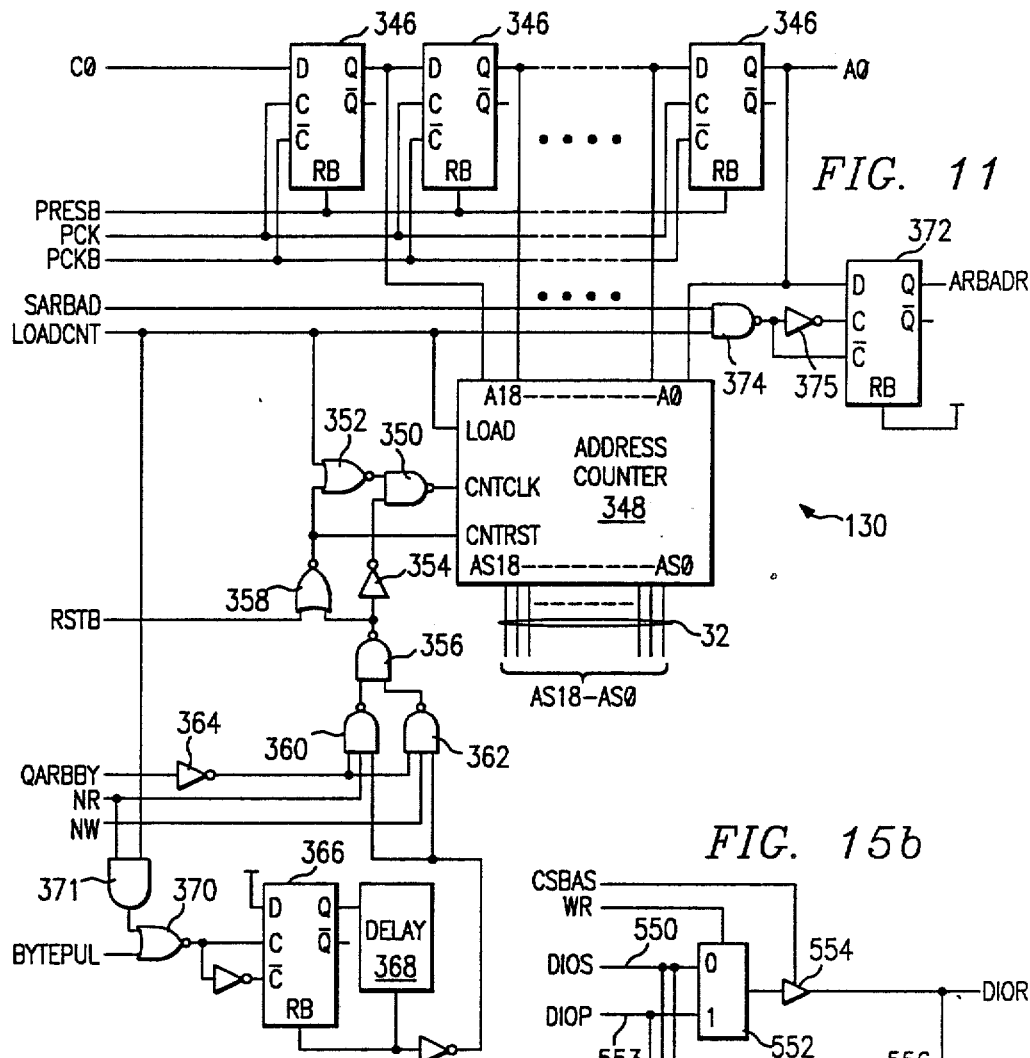
FIG. 11 illustrates a logic diagram of the address field block.

Referring now to FIG. 11, there is illustrated a logic diagram of the address field block 130. Generally, the address field is shifted in and stored in a nineteen-bit shift register. The shift register is comprised of nineteen D-type flip flops 346. Each of the flip flops 346 in the shift register has the D-input thereof connected to the Q-output of the preceding one of the flip flops with the last of the flip flops 346 in the shift register having the Q-output thereof connected to the A∅ output and the first of the flip flops 346 in the shift register having the D-input thereof connected to the C∅ input. The clock inputs of all of the flip flops 346 are connected to the PCK signal and the clockbar inputs are connected to the PCKB signal. The reset input is connected to the PRESB signal.

The outputs of the flip flops 346 provide the address signals A∅–A18, which are input to the parallel input of a sequential address counter 348. The address counter 348 has a load input connected to the LOADCNT input to load the value of the nineteen bit shift register therein for output on the bus 32. After loading, a signal is input to a count input CNTCLK for incrementing the counter 348. The CNTCLK input is connected to the output of a NAND gate 350, one input of which is connected to the output of a NOR gate 352 and the other of which is connected through an invertor 354 to the output of a NAND gate 356. The reset input RSTB is connected through a two-input NOR gate 358 to the CNTRST input for the reset operation in the counter 348, the other input of NOR gate 358 being connected to the output of the NAND gate 356. The NOR gate 352 has one input thereof connected to the reset input on the counter 348 and the other input thereof connected to the LOADCNT signal. The NOR gate 352 and NAND gate 350 operates to force the CNTCLK input to a "1" for a reset or load operation.

The NAND gate 356 has one input thereof connected to the output of a three-input NAND gate 360 and the other input thereof connected to the output of a three input NAND gate 362. One input of each of NAND gates 360 and 362 is connected through an invertor 364 to the QARBBY input. One input of NAND gate 360 is connected to the NR signal and one input of NAND gate 362 is connected to the NW signal. One input of NAND gate 360 and one input of NAND gate 362 are connected together and to the Q-output of a flip flop 366 through six series connected invertors 368. The output of the fifth invertor in the string 368 is connected to the reset input of the flip flop 366 and the D-input thereof is connected to the positive power supply voltage. The clock and clock-bar inputs are connected to the output of a NOR gate 370, one input of which is connected to the BYTEPUL signal and the other input thereof connected to the output of an AND gate 371, one input of which is connected to NR and the other of which is connected to the LOADCNT signal. Therefore, the LOADCNT signal in the presence of the NR signal during a Read operation and the BYTEPUL signal operate to clock the flip flop 366. As described above, this allows the initial address loaded into the counter 348 on a Read operation to be output the address to the RAM 12 immediately after loading of the protocol word. Accessed data is then loaded into the eight-bit shift register 122. It is necessary to use the LOADCNT signal since the BYTEPUL signal does not occur until after the first full byte has occurred. The flip flop 366 outputs a pulse that has a duration equal to the delay provided by the five invertors in the string 368, this pulse being delayed through the last of the invertors for input to the NAND gates 360 and 362 to clock the address counter 348, depending on the state of the NR, NW and QARBBY signals.

The arbitration address signal ARBADR is provided from the output of a D-type flip flop 372, the D-input of which is connected to the A∅ address and the clock input of which is connected through an invertor 375 to the output of a NAND gate 374. NAND gate 374 has one input thereof connected to the LOADCNT input and the other input thereof connected to the SARBAD input. The reset input of flip flop 372 is connected to the positive supply. Therefore, when the SARBAD signal is present from the control field block 132, the logic state of the A∅ address in the address field is clocked through to the Q-output of flip flop 372. As described above, this determines whether the address location of the arbitration device is all ones or all zeroes.

Function Field Block

Figure 12:
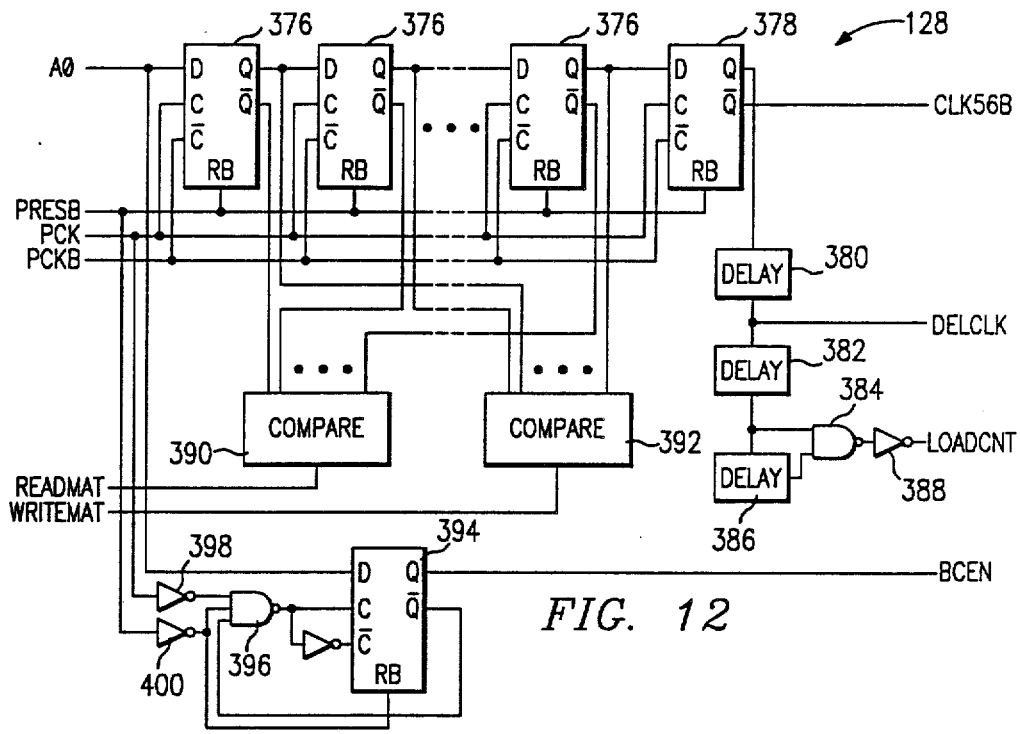
FIG. 12 illustrates a logic diagram of the function field block.

Referring now to FIG. 12, there is illustrated a logic diagram of the function field block 128. As described above, the function field is eight bits wide and is stored in an eight-bit shift register. The eight-bit shift register is comprised of eight D-type flip flops 376. Flip flops 376 have the D-input thereof connected to the Q-output of the previous flip flop with the input of the first flip flop 376 in the shift register being connected to the A∅ input and the output of the last of the flip flops 376 having the Q-output connected to the D-input of a D-type flip flop 378. The clock inputs of flip flops 376 and flip flop 378 are connected to the PCK input with the clock-bar inputs thereof connected to the PCKB input. All of the reset inputs of flip flops 376 and the flip flop 378 are connected to the PRESB signal.

The Q-output of flip flop 378 is connected to the input of a delay circuit 380, the output of which comprises the delay clock signal (DELCLK). The DELCLK signal is also input through a second delay 382, the output of which is input to one input of a NAND gate 384, the other input of which is connected to the output of delay clock 382 through another delay 386, delay 386 providing a pulse output from NAND gate 384 which is input to an invertor 388 to provide the LOADCNT signal on the output thereof. The Q-bar output of flip flop 378 provides a CLK56B output. As described above, there is always a logic "1" bit that precedes the data shifted into the protocol shift register. When this bit enters the D-flip flop 378, the Q-output goes high and the Q-bar output goes low. The delay clock (DELCLK) signal is generated after the delay of delay 380 with the LOADCNT signal generated after a predetermined amount of time determined by the delay 382.

The Q- and Q-bar outputs of the flip flops 376 are selectively input to either a compare circuit 390 or a compare circuit 392. When all of the bits that are input to either the compare circuit 390 or the compare circuit 392 are a logic "1", the respective output thereof is high. The output of the compare circuit 390 comprises the Read Match signal READMAT and the output of the compare circuit 392 comprises the Write Match signal WRITEMAT.

The BCEN signal is generated on the output of a flip flop 394. The D-input of which is connected to the A∅ input. The clock input of flip flop 394 is connected through a three-input NAND gate 396 which has one input thereof connected through an invertor 398 to the PCK signal, one input thereof connected through an invertor 400 to the PRESB signal and the other input of which is connected to the Q-bar output of flip flop 394. The output of invertor 400 is also connected to the reset input of flip flop 394. Flip flop 394 is operable to generate the BCEN signal on the rising edge of the PCK signal when A∅ is equal to "1" after being reset by the global preset signal PRESB on the forty-eighth rising edge after the reset signal goes high which is one byte before shifting in of the last of the fifty-six protocol bits.

Eight-Bit Shift Register

Figure 13:
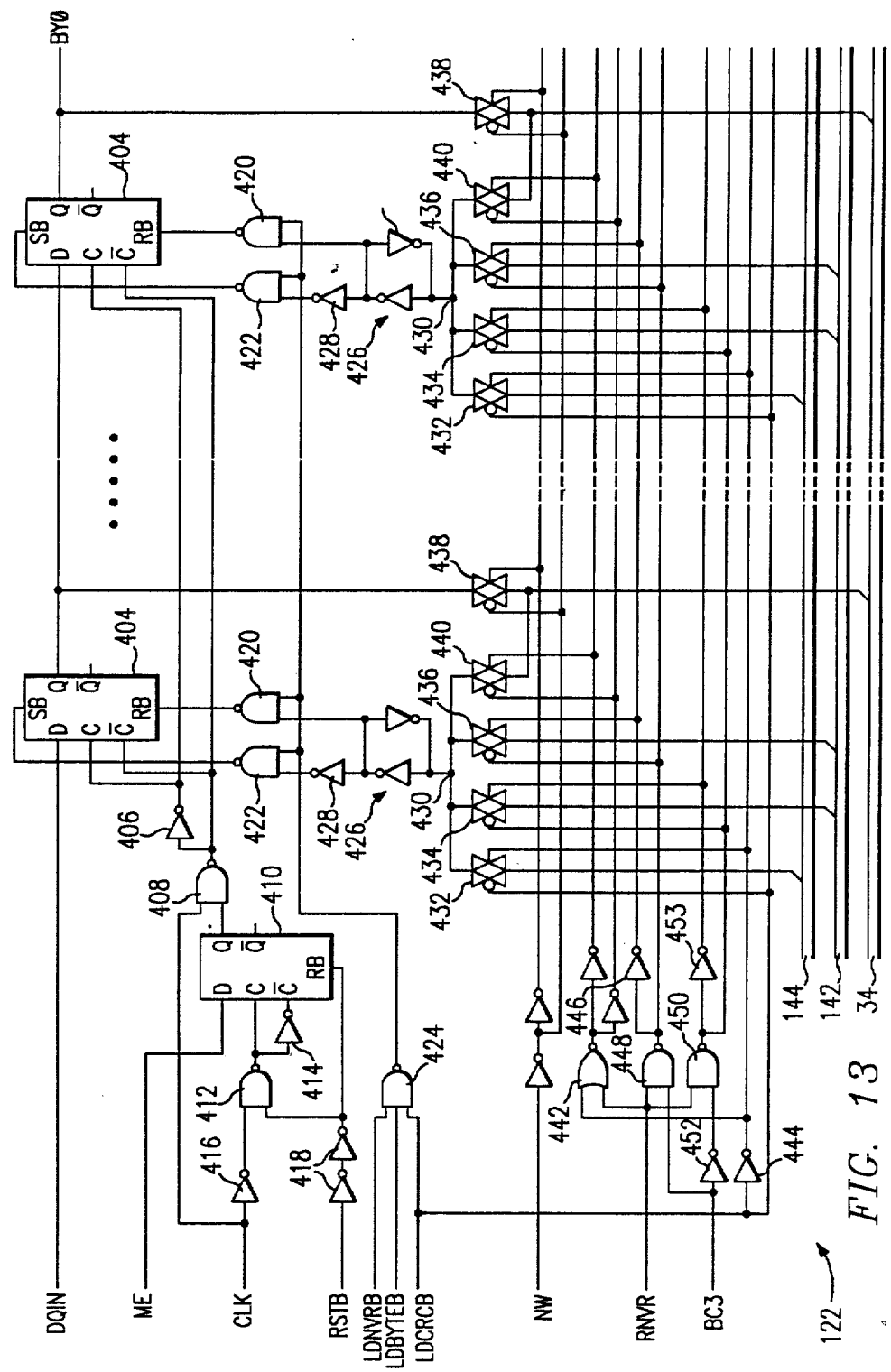
FIG. 13 illustrates a logic diagram of the eight-bit shift register.

Referring now to FIG. 13, there is illustrated a logic diagram of the eight-bit shift register 122. Shift register 122 is generally comprised of eight D-type flip flops 404 connected as a serial shift register with the D-input of each of the flip flops 404 connected to the Q-output of the previous flip flop 404. The D-input of the first flip flop 404 in the shift register is connected to the DQIN input and the Q-output of the last flip flop 404 in the shift register is connected to the BY∅ output. The clock inputs of flip flops 404 are connected through an invertor 406 to the output of a two-input AND gate 408 and the clock-bar inputs are connected to the output of the AND gate 408. One input of AND gate 408 is connected to the output of a two-input NAND gate 409, and the other input of which is connected to the output of an invertor 411, the input of which is connected to the signal LOADSR2. The NAND gate 409 has one input thereof connected to the Q-output of a flip flop 410 and the other input thereof connected to the CLK signal. The flip flop 410 has the D-input thereof connected to the Master Enable signal ME and the clock inputs thereof connected to the output of a NAND gate 412 with an invertor 414 inverting the output of NAND gate 412 for input to the clock-bar input. NAND gate 412 has one input thereof connected through an invertor 416 to the CLK signal and the other input thereof connected through two series connected invertors 418 to the RSTB input. Flip flop 410 is operable to clock through the ME signal and latch it on the Q-output of flip flop 410 on the edge of the CLK signal such that no shifting occurs until the ME signal is present. Thereafter, the CLK signal clocks the flip flops 404.

Each of the flip flops 404 has the reset input connected to the output of a two-input NAND gate 420. The set input is connected to the output of a two-input NAND gate 422. One input of each of the NAND gates 420 and 422 is connected to the output of a three-input NAND gate 424 which comprises the LOADSR2 signal for loading the shift registers. One input of NAND gate 424 is connected to the LDNVRB input, one input thereof is connected to the LDBYTEB input and the other input is connected to the LDCRCB signal. When any one of these signals goes low, the LOADSR signal goes high to load the shift registers.

The other input of NAND gate 422 is connected to the output of a latch 426 through an invertor 428. Latch 426 is comprised of two invertors configured in a back-to-back configuration. The other input of NAND gate 420 is connected directly to the output of the latch 426. The input of latch 426 is connected to a node 430. Latch 426 is operable to store the data to be loaded into the shift register in response to the LOADSR signal going high.

Node 430 is connected through a transfer gate 432 to one line in the bus 144. The node 430 is also connected to two lines of the bus 144 through the transfer gates 434 and 436, respectively. As described above, during one half of a load operation, one of the lines NV∅-NV7 is loaded into the latch 426 and, during the second half of the load operation thereafter, the associated one of the lines NV8-NV15 is loaded into the latch 426. For example, the first flip flop 404 connected to DQIN illustrated in FIG. 13 comprises the MSB of the shift register. Therefore, on the first operation, the signal on output line NV7 would be loaded into the latch 426 and, thereafter, the signal on output line NV15 would be stored in the latch 426. The associated data line from bus 34 is connected to the Q-output of flip flop 404 through a transfer gate 438 to allow writing thereof and also through a transfer gate 440 to allow reading thereof and storage in the latch 426. The transfer gate 432 is controlled by the LDCRCB input representing the loading operation for the CRC register 136. The transfer gate 440 is controlled to load the latch 426 by the LDRAM signal on the output of a two-input NOR gate 442. NOR gate 442 has one input thereof connected through an invertor 444 to the LDCRCB input and the other input thereof connected to the RNVR input. The transfer gate 440 transfers data to the latch 426 when the LDRAM signal is high and when both inputs of NOR gate 442 are low. The transfer gate 438 is controlled by the NW input.

The two transfer gates 434 and 436 are controlled to sequentially write the lower half and upper half of the sixteen-bit nonvolatile portion of the cartridge select block 134. The eight least significant bits are input to transfer gate 436 and are transferred to latch 426 when the signal LDNVRL is high, which signal is connected through an invertor 446 to the output of a NAND gate 448. NAND gate 448 is connected to the RNVR input and the other input thereof is connected to the BC3 input. Therefore, when both the RNVR signal and the BC3 signal are high, transfer gate 436 is operable to transfer information. The upper half of the sixteen-bit nonvolatile register in the cartridge select block 134 is transferred to latch 426 by transfer gate 434 by the LDNVRM signal. This signal is output from a NAND gate 450 through an invertor 452. One input of NAND gate 450 is connected through an invertor 453 to the BC3 input and the other input thereof is connected to the RNVR signal. When RNVR is high and BC3 is low, the upper half of the non-volatile register in the cartridge select block 134 is transferred to the shift register 122.

Four Bit Counter

Figure 14:
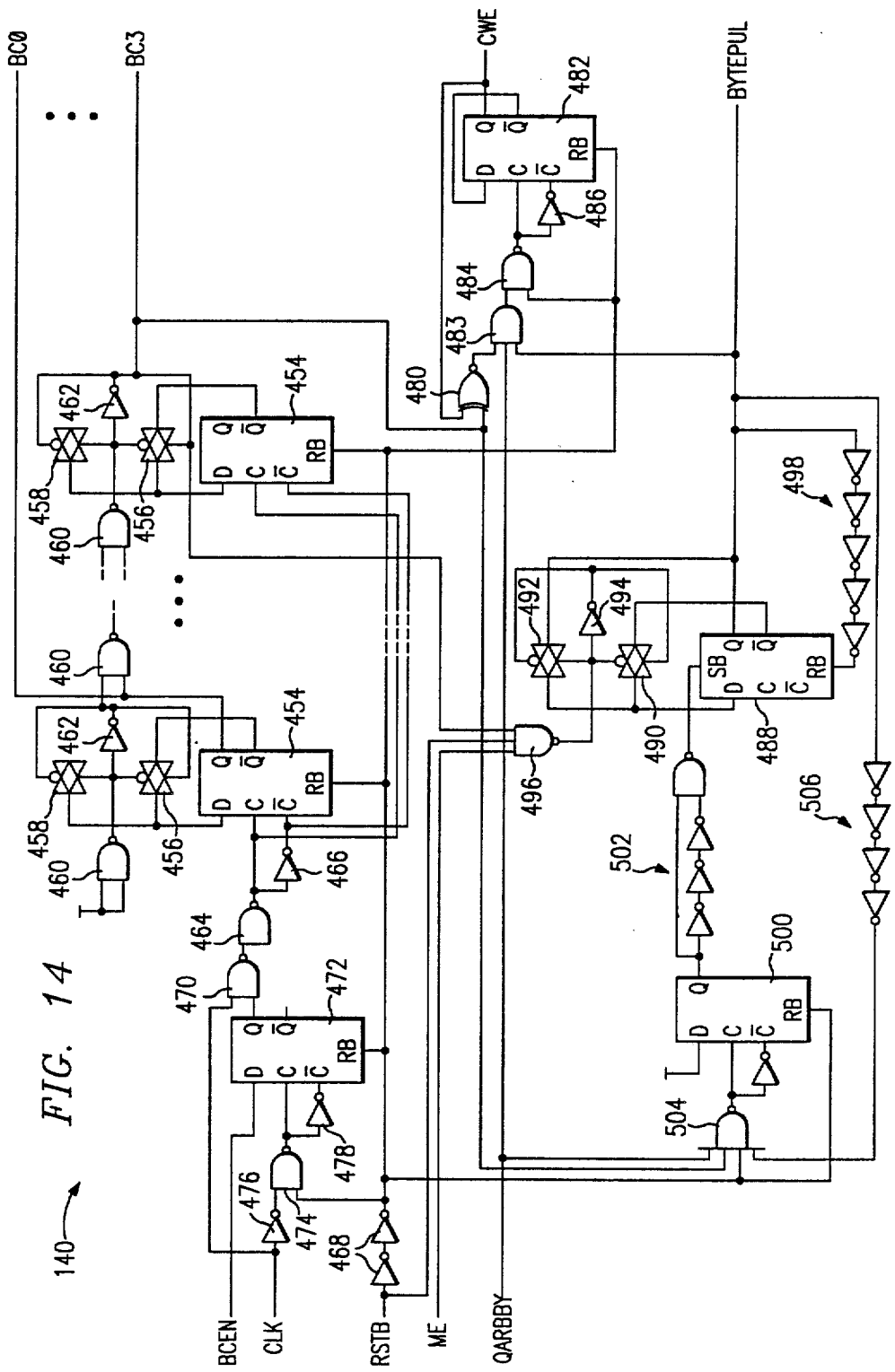
FIG. 14 illustrates a logic diagram of the four-bit byte counter.
Figure 15A:
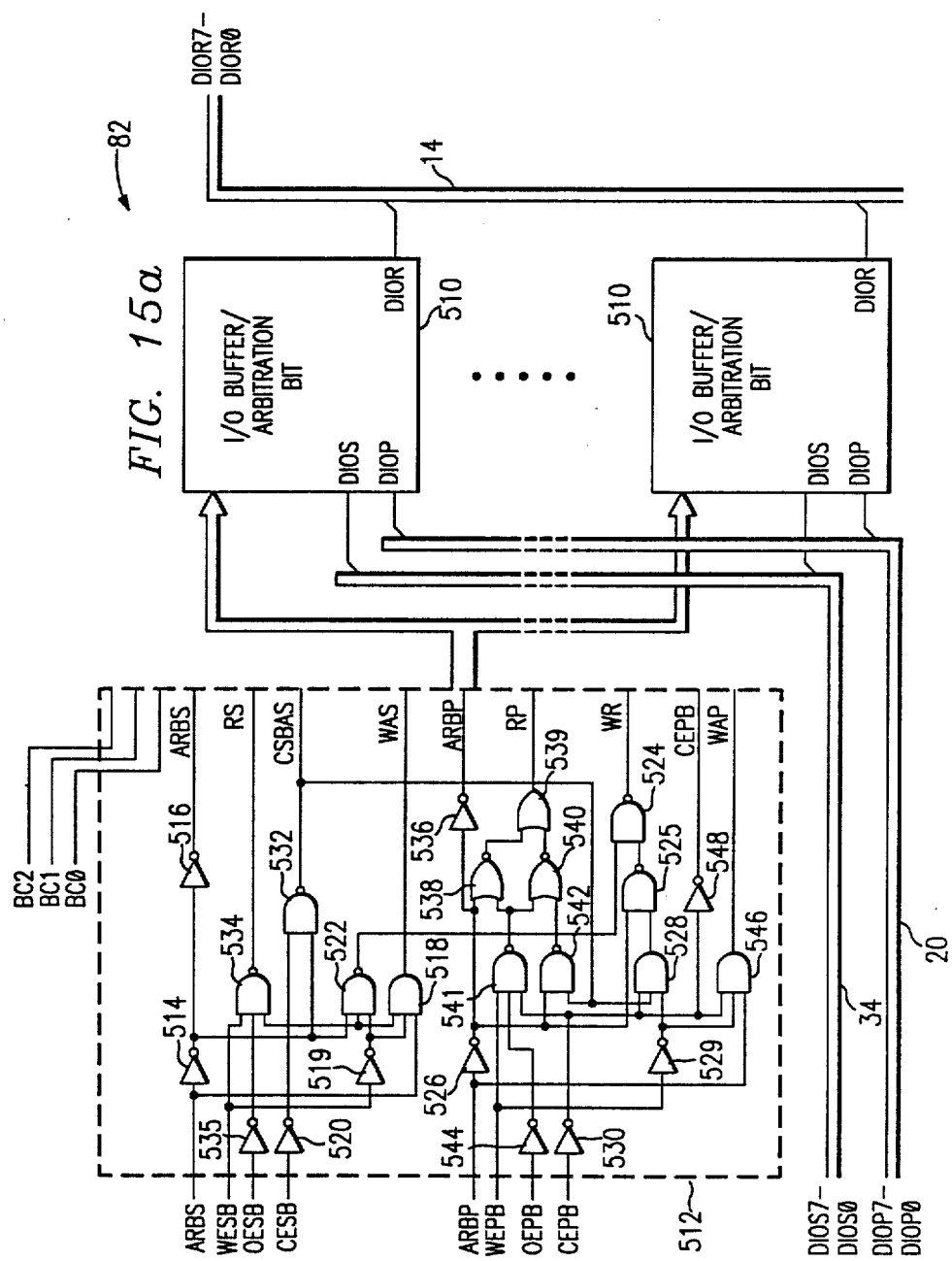

Referring now to FIG. 14, there is illustrated a logic diagram of the four-bit counter 140. The four-bit counter is comprised basically of four D-type flip flops 454 arranged in a four-bit counter configuration. The Q-bar output of each of the flip flops 454 is connected to the D-input thereof through a transfer gate 456 and the Q-output thereof is connected to the D-input thereof through a transfer gate 458. A NAND gate 460 is provided having the output thereof connected to the input of an invertor 462 and also connected to the control input of the transfer gate 458, such that the transfer gate 458 connects the Q-output to the D-input when the output of the NAND gate 460 is at a logic high and the output of invertor 462 is low. The output of the invertor 462 is connected to the control input of the transfer gate 456 such that when the output of invertor 462 is always a logic high, the Q-bar output of flip flop 454 is connected to the D-input thereof. The output of invertor 462 is connected to one input of the NAND gate 460 associated with the next sequential flip flop 454 in the counter. For the first bit in the counter, the two inputs of the NAND gate 460 associated therewith are connected to a positive supply such that the output of invertor 462 is a logic high and the Q-bar output thereof is always connected to the D-input. The Q-output therefore comprises the BC∅ output.

In operation, when the Q-outputs of all preceeding flip flops 454 go high, the output of NAND gate 460 goes low to connect the Q-bar output of the next of the flip flops 454 for the next bit to the D-input thereof. The outputs BC∅-BC3 provide the count value that is stored in the first field 51 of the arbitration byte 38 which, as described above, provides a count value to determine the end of each byte on the serial port which coincides to the transfer of data to and from the RAM 12, during the access window.

Each of the flip flops 454 have the clock inputs thereof connected to the output of a NAND gate 464 with the clock-bar inputs thereof connected to the output of NAND gate 454 through invertor 466. The reset inputs of flip flops 454 and one input of NAND gate 464 are connected to the RSTB input through two series-connected invertors 468. The other input of NAND gate 464 is connected to the output of a NAND gate 470. NAND gate 470 has one input thereof connected to the Q-output of a flip flop 472 and the other input thereof connected to the CLK signal. Flip flop 472 has the D-input thereof connected to the BCEN signal and the clock input thereof is connected to the output of a NAND gate 474. One input of NAND gate 474 is connected to the CLK signal through an invertor 476 and the other input thereof is connected to the reset input RSTB through invertors 468. The reset input of flip flop 472 is also connected to the reset output of invertors 468. The clock-bar input of flip flop 472 is connected to the output of NAND gate 474 through an invertor 478.

In operation, the NAND gate 470 inhibits operation of the counter until generation of the enable signal BCEN. As described above, the enable signal BCEN is generated one byte prior to the entire fifty-six bit protocol field being loaded into the protocol shift register. This provides the count value BC∅-BC3 on the output of the four-bit counter 140 prior to the transfer of any data from RAM 12 on the serial data link 18. As described above, this is important in an initial Read operation, since data transfer will occur immediately after loading of the protocol word during the first access window. Therefore, the parallel CPU operating in the interleaved mode can examine the count bits C∅-C2 in the first field 51 of the arbitration byte 38 to determine if the serial CPU 28 has access to the system. This allows the parallel CPU 24 to make a determination as to when the system is free for access and thus minimizes the possibility of a collision even on the first access by the serial CPU 28.

The BC3 output of the counter is input to one input of an Exclusive NOR gate 480, the other input thereof connected to the Q-output of a flip flop 482. The output of Exclusive NOR gate 480 is connected to one input of a three-input AND gate 483, an other input of which is connected to the signal QARBBY and the third input of which is connected to the output BYTEPUL. The output of the AND gate 483 is connected to one input of a NAND gate 484, the other input of which is connected to the reset input RSTB through invertors 468. The output of NAND gate 484 provides the clock input for flip flop 483 and the clock-bar input through invertor 486. Flip flop 482 has the D-input thereof connected to the Q-bar output and the Q-output provides the Compressed Write Enable signal CWE.

The BYTEPUL signal is generated on the output of a flip flop 488 which is configured similar to the flip flops 454. A transfer gate 490 corresponds to transfer gate 456, a transfer gate 492 corresponds to transfer gate 458 and an invertor 494 corresponds to invertor 462. A three-input NAND gate 496 is provided that corresponds to NAND gate 460. Gate 496 is utilized to prevent the BYTEPUL signal from being generated at the time the CLK56B signal goes low or on a serial reset. The clock and clock-bar inputs of flip flop 488 are connected to the clock and clock-bar inputs, respectively, of flip flops 454, and the reset input of flip flop 488 is connected to the BYTEPUL output through five series-connected invertors 498 to provide a time delay. The NAND gate 496 has one input thereof connected to the Master Enable signal ME and the other input thereof connected to the output of the invertor 462 on the flip flop 454 associated with the BC3 output. Therefore, when BC∅, BC1, BC2, ME and RSTB are high, the output of invertor 494 goes high and transfers the Q-bar output to the D-input thereof and the BYTEPUL output goes high at the receipt of the next rising edge of the clock on the flip flop 488 for a predetermined amount of time determined by the invertors 498. This signal which is a pulse indicates the end of a byte which is utilized by the control signal block 138 for output of control signals, and by the address field block 130 to increment the internal counter 348.

The flip flop 488 has the set input thereof connected to the Q-output of a flip flop 500 through a pulse circuit 502. The D-input of flip flop 500 is connected to a positive supply and the clock inputs are connected to the output of a four-input NAND gate 504 which has one input thereof connected to the QARBBY input, one input thereof connected to the BC3 output, one input thereof connected to the reset signal in the output of invertors 468 and the other input thereof connected to the BYTEPUL signal through a delay circuit 506. This circuit creates a second BYTEPUL pulse off of one clock edge in a query arbitration byte access.

Arbitration Byte/Control Circuit

Referring now to FIGS. 15a–15d, there is illustrated detailed logic diagrams of the I/O buffers/arbitration byte/control logic block 82. The block 82 is comprised of eight I/O buffers and arbitration bits 510 each having three ports, one port interfaced with a data line on bus 14, one port interfaced with a data line on bus 20 and one port interfaced with a data line of bus 34. A control circuit 512 is provided for generating directional control logic signals for select inputs to the I/O buffer and arbitration bits 510. Additionally, the outputs BC∅–BC2 from the four-bit counter 140 are also input to the first three I/O buffers and arbitration bits 510.

The control circuit 512 receives on the input thereof parallel control signals WEPB, CEPB and OEPB and also the serial control signals OESB, WESB and CESB. The arbitration match signals ARBS and ARBP for the serial and parallel ports respectively are also input through to the control circuit 512. The ARBS signal is input to one input of an invertor 514, the output of which is connected to the input of a second invertor 516, the output of invertor 516 providing the ARBS output of control circuit 512 for input to the arbitration bits 510. The ARBS signal is also input to one input of a three-input AND gate 518, the output of which provides the WAS signal for input to the arbitration bits 510. The WAS signal is a control signal for indicating a Write Operation to the arbitration bit from the serial port 19. The WESB signal is also input to one input of the AND gate 518 through an invertor 519. The remaining input of the AND gate 518 is connected to the CESB signal through an invertor 520.

The output of invertor 519 is also input to one input of a three-input NAND gate 522, one input of which is connected to the output of invertor 520 and one input of which is connected to the output of invertor 514. The output of NAND gate 522 is connected to one input of a two-input NAND gate 524, the output of which provides the WR output. The WR output provides a control signal for writing to the RAM. The other input of NAND gate 524 is connected to the output of a two-input NAND gate 525, one input of which is connected o the ARBP signal through an invertor 526 and the other input of which is connected to the output of a three-input AND gate 528. The AND gate 528 has one input thereof connected through an invertor 529 to the WEPB signal, one input thereof connected to the CEPB input through an invertor 530 and the other input thereof connected to the output of a two-input NAND gate 532. NAND gate 532 provides the CSBAS output which provides the chip select serial signal or the arbitration serial signal. The NAND gate 532 has one input thereof connected to the output of invertor 514 and the other input thereof connected to the output of invertor 520.

The WESB signal is also input to one input of a three-input NAND gate 534, the output of which provides the RS signal for reading from the serial prot. Another input of NAND gate 534 is connected through an invertor 535 to the OESB signal and the remaining input thereof is connected to the output of invertor 520.

The output of invertor 526 is connected through an invertor 536 to provide the ARBP output to the arbitration bits 510. The output of invertor 526 is also connected to one input of a two-input NOR gate 538, the output of which is connected to one input of a two-input OR gate 539, the output of which provides the RP signal for reading from the parallel port. The other input of the OR gate 539 is connected to the output of a two-input NOR gate 540, one input of which is connected to the output of a three-input NAND gate 541 and the other input of which is connected to the output of a two-input NAND gate 542. One input of NAND gate 541 is connected to the WEBP signal, another input is connected through an invertor 544 to the OEPB signal and the remaining input thereof is connected to the output of invertor 530. The NAND gate 542 has one input thereof connected to the output of invertor 526 and the other input thereof connected to the CSBAS signal on the output of NAND gate 532. The ARBP signal is also input to one signal of a three-input AND gate 546, the output of which provides the WAP signal to write to the arbitration bits from the parallel port. Another input of the AND gate 546 is connected to the output of the invertor 529 and the remaining input thereof is connected to the output of invertor 530. The output of invertor 530 is also connected through an invertor 548 to provide the CEPB signal for input to the arbitration bits 510.

Figure 15B:
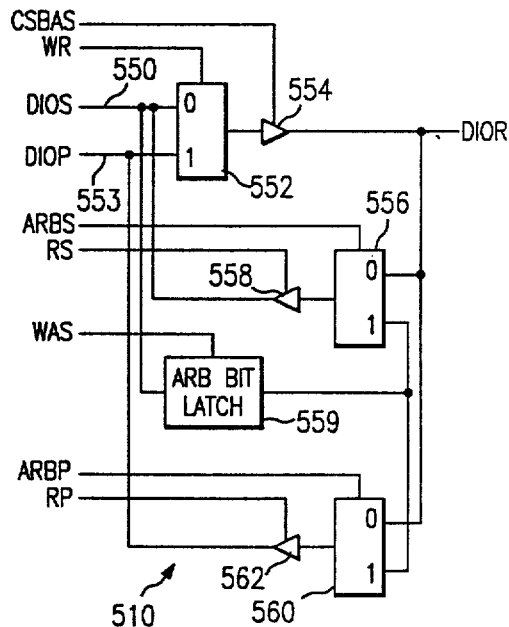
FIGS. 15a–d illustrate logic diagrams of the I/O buffers and arbitration byte.

Referring now to FIG. 15b, there is illustrated a schematic block diagram of the I/O buffer and arbitration bit 510 associated with the data lines DIO3, DIO4, and DIO5 which are also associated with the arbitration bits in fields 53 and arbitration byte 38. As described above, the three bits S$\emptyset$, S1 and S2 can be read by both the parallel port 49 and the serial port 47, but can only be written to by the serial port 47. The serial input data is received on a data line 550 and labelled DIOS, and is input to a multiplexer 552, the output of which is connected through a transfer gate 554 to the output line DIOR. The other input of the multiplexer 552 is connected to an input line 553, labelled DIOP, which provides the parallel data line. The multiplexer 552 is controlled by the CSBAS control signal and the transfer gate 552 is controlled by the WR signal. Therefore, when the CSBAS signal is low, and the WR signal is high, data from the DIOS line is selected by multiplexer 552 and output to the DIOR line. When CSBAS is high and WR is high, data from the DIOP line is selected and output to the DIOR line.

The DIOR line is connected to the input of a two-input multiplexer 556, the output of which is connected through a driver 558 to the DIOS line 550. The other input to multiplexer 556 is connected to the output of a latch 559, the input of which is connected to the DIOS line 550. The driver 558 is controlled by the RS control line, the control input to the multiplexer 556 is connected to the ARBS control line and the control input to the latch 559 is controlled by the WAS input. Therefore, when the RS control signal is present and the ARBS input is low, the DIOR line is selected for connection to the DIOS line 550 to provide a Read operation to the serial port. However, when the ARBS signal is high, the contents of the latch 559 are read to the serial port providing the Read operation of the arbitration bit.

The output of the arbitration bit latch 559 is also input to one input of a multiplexer 560, the output of which is connected through a driver 562 to the DIOP line 553. The other input of the multiplexer 560 is connected to the DIOR line. The control input for the driver 562 is connected to the RP control signal and the control input for the multiplexer 560 is connected to the ARBP control signal. When the RP signal is high indicating a Read to the parallel port operation and the ARBP control signal is low, the data on the DIOR line is read to the DIOP line 553 and to the parallel port. However, when the ARBP signal is high indicating access to the arbitration bit by the parallel port, the contents of the latch of the arbitration bit are selected by the multiplexer 560 for reading to the DIOP line 553.

Figure 15C:
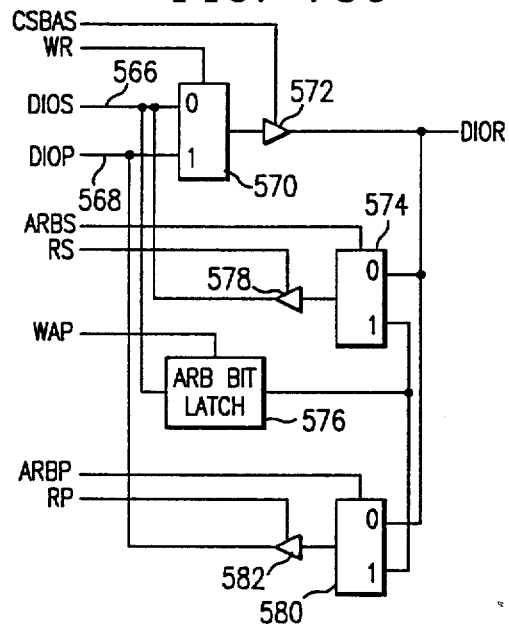

Referring now to FIG. 15c, there is illustrated a schematic block diagram of the I/O buffer and arbitration bit for data lines DIOR6 and DIOR7 which, as described above, correspond to the arbitration bits B$\emptyset$ and B1 in field 55 in the arbitration byte 38. A data line 566, labelled DIOS, is connected to the serial data bus 34 and a data line 568, labelled DIOP is connected to the parallel data bus 20. Data lines 566 and 568 are input to separate inputs of a two input multiplexer 570, the output of which is connected through a driver 572 to the DIOR data line. The DIOR data line is interfaced with the system data bus 14. The control input for the multiplexer 570 is connected to the CSBAS signal and the control input for the driver 572 is connected to the WR control signal. When the control signal CSBAS is low and the WR signal is high, data is written from the DIOS line 566 to the DIOR line to provide a Write operation to the RAM from the serial port. However, when the CSBAS signal is high, the data from the DIOP line 568 is written to the RAM through the data line DIOR.

The DIOR line is connected to one input of a multiplexer 574, the other input of which is connected to the output of an arbitration bit latch 576. The input to the latch 576 is connected to the DIOP line 568 for storing data therein from the parallel port. The output of the multiplexer 574 is connected through a driver 578 to DIOS line 566. The driver 578 has the control input thereof connected to the RS control signal, the multiplexer 574 has the control input thereof connected to the ARBS control signal and the latch 576 has the control input thereof connected to the WAP control signal. Therefore, the latch 576 is operable to have the contents thereof replaced by information from the DIOP line 568 in the presence of the WAP signal. In a similar manner, the driver 578 is activated in the presence of the RS control signal indicating a Read to the serial port. Therefore, when the ARBS signal is low, the data on the DIOR line is read to the serial port, and when the ARBS signal is high, the contents of the latch 576 are read to the serial port.

The DIOR line is also connected to one input of a multiplexer 580 and the other input thereof is connected to the output of the latch 576. The output of multiplexer 580 is connected through a driver 582 to the DIOP line 568. The driver 582 has the control input thereof connected to the RP signal and the multiplexer 580 has the control input thereof connected to the ARBP control signal. Therefore, when the RP signal is present and the ARBP signal is low, the data on the DIOR line is read to the DIOP line 568 and the parallel port. When the ARBP signal is high, the contents of the latch 576 are read to the parallel port.

Figure 15D:
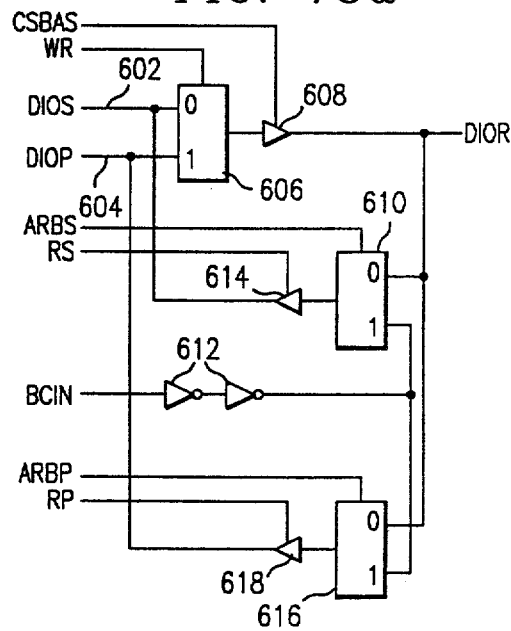

Referring now to FIGS. 15d, there is illustrated a schematic block diagram of the I/O buffer and arbitration bit 510 for data lines DIO0, DIO1 and DIO2 which, as described above, are associated with arbitration bits C0, C1 and C2 in field 51 of the arbitration byte 38. A data line 602, labelled DIOS, comprises one of the data lines in bus 34 for interfacing with the serial port and a data line 604, labelled DIOP, is provided for interfacing with bus 20 for the parallel port. Data line 602 is one input of a multiplexer 606, the other input of which is connected to the data line 604. The output of multiplexer 606 is connected to the DIOR data line through a transfer gate 608. The control input for the transfer gate 608 is connected to the WR control signal and the control input for the multiplexer 606 is connected to the CSBAS control signal. When WR is high indicating a Write operation to the RAM from either the serial or the parallel port, the control signal CSBAS selects data line 602 or the data line 604 for connection to the data line DIOR. When CSBAS is low, data line 602 is selected and when CSBAS is high, data line 604 is selected.

The data line DIOR is connected to one input of a two-input multiplexer 610, the other input of which is connected through two series connected invertors 612 through the BCIN input. The output of a multiplexer 610 is connected through a transfer gate 614 to the DIOS data line 602. The control input for the transfer gate 614 is connected to the signal RS and the control input for the multiplexer 610 is connected to the signal ARBS. When RS is high, indicating a Read to serial port the multiplexer 610 selects between the data on the line DIOR if ARBS is low, or the BCIN value if ARBS is high for output to the serial port through data line DIOS 602.

The DIOR line is also connected to one input of a multiplexer 616, the other input of which is connected to the BCIN input through the invertors 612. The output of multiplexer 616 is connected through a transfer gate 618 to the DIOP line 604. The control input of the transfer gate 618 is connected to the RP input indicating a Read to the parallel port, and the control input to the multiplexer 616 is connected to the ARBP input. When ARBP is low, the data line DIOR is selected, and when ARBP is high, the BCIN input is selected. Multiplexer 616 and transfer gate 618 therefore allow the parallel port to read the count input in the arbitration byte 38 or read data from the RAM 12.

Control Mux

Referring now to FIG. 16, there is illustrated a logic diagram of the control multiplexer 94 of FIG. 4. The multiplexer 94 is comprised of a multiplexer 624 operable to have three pairs of inputs for being connected to an associated one of three outputs on lines 96. The multiplexer is controlled by the logical "OR" of the CESB input and the ARBS input such that whenever a Chip Enable for the serial port is present and the serial port is not accessing the arbitration byte, the control signals for the serial port are selected and, when the Chip Enable signal for the serial port is not present, the control signals for the parallel port are selected. Two inputs on the A0 and A1 inputs comprise the CESB and CEPB inputs, which are selected for connection to the CERB output. The CESB input is connected to one input of an OR gate 634, the other input of which is connected to the ARBS signal and the output connected to the A0 input. The OESB signal is input to multiplexer 624 on the C0 input and the OEPB signal is input to one input of a NAND gate 635 through an invertor 637, the output of NAND gate 635 connected to the C1 input. The other input of NAND gate 635 is connected to the output of invertor 636. The Write Enable signal WEPB is input to a NAND gate 628 through invertor 632. 628 is connected to the ARBP input through an invertor 636. The output of the NAND gate 628 is input to the multiplexer 624 on input B1. The WESB input is connected to the B0 input.

Parallel Port Control Buffers

Referring now to FIG. 17, there is illustrated a logic diagram of the parallel port control buffers 90 of FIG. 4. The input Write Enable signal INWEPB is input to one input of an OR gate 638, the other input of which is connected to the CEPB output. The output of OR gate 638 provides the WEPB output. The Output Enable signal that is input to the control buffer 90 is input to one input of an OR gate 640, the other input of which is connected to the CEPB output signal and the output of which comprises the OEPB signal. The input Chip Enable signal INCEPB is input to one input of an OR gate 642, the other input of which is connected to ground and the output of which comprises the CEPB signal. Therefore, when the Chip Enable signal is absent, generation of the Write Enable and Output Enable signals is inhibited.

In summary, there is provided a dual port RAM for allowing access to a memory array through a serial port and a parallel port. The dual port RAM is controlled by an arbiter which determines which port has access. In one mode, the serial port is afforded priority whereas the parallel port must poll an internal arbitration register to determine the status of the serial port access. In the second mode, access is afforded to the first of the ports attempting access. The internal arbitration register provides status information as to which port has access to the system. Each port polls this arbitration register to determine the status of the system.

Although the preferred embodiment has been described in detail, it should be understood that various changes, substitutions and alterations can be made therein without departing from the spirit and scope of the invention as defined by the appended claims.

What is claimed is:

1. A duel port RAM, comprising:
   a first port for receiving an address and for transfer of data;
   a second port for receiving an address and for transfer of data;
   an array of memory locations for storing data, each of said memory locations having an array address associated therewith; and arbitration means for receiving addresses from said first port and determining if the received address from said first port is an array address, said arbitration means being operable to transmit addresses from said first port to said array and transfer data between said first port and said array when the received address from said first port is an array address, and said arbitration means being operable to transmit addresses from said second port to said array and transfer data between said second port and said array when an array address is not received from said first port;

arbitration storage means for storing arbitration status information of said arbitration means, said arbitration storage means having a predetermined address associated therewith, said predetermined address being continuous with the sequence of said array addresses;

said arbitration means including:

match means for receiving addresses from said first and second ports and determining if said addresses from said first or second ports match said predetermined address, and access means for accessing said arbitration storage means when said match means determines that said arbitration address is received from either said first port or said second port, said access means transmitting said arbitration status information from said arbitration storage means to the one of said first and second ports from which said arbitration address was received.

2. The dual port RAM of claim 1, wherein said arbitration status information comprises handshake information to allow communication between said first and second ports through said arbitration storage means, and wherein said arbitration means includes means for transferring handshake information from the one of said first and second ports from which said arbitration address was received for storage of the received handshake information in said arbitration storage means.

3. The dual port RAM of claim 2, wherein said arbitration storage means comprises a first field for storing handshake information received from said first port and a second field for storing handshake information received from said second port, and wherein said access means is operable to route handshake information received from said first port to said first field and handshake information received from said second port to said second field, said first and second fields comprising said arbitration status information.

4. The dual port RAM of claim 3 wherein said arbitration storage means further comprises a third field for storing system status information for transmission only to the one of said first and second ports from which said arbitration address was received after receipt of said arbitration address.

5. The dual port RAM of claim 1 wherein said predetermined address associated with said arbitration storage means can be changed in response to external signals received from said first port.

6. The dual port RAM of claim 1, wherein said first port comprises a serial port and said second port comprises a parallel port.

7. The dual port RAM of claim 1, wherein said arbitration means comprises:

data transfer means operable in first and second modes for transferring data between said array and said first port in the first mode and between said array and said second port in the second mode;

address transfer means operable in first and second modes for transferring addresses from said first port to said array in the first mode and from said second port to said array in the second mode;

address means for determining if an array address is received from said first port;

control means for controlling said data transfer means and said address transfer means to operate in the respective first modes thereof when an array address is received from said first port and in the respective second modes thereof when an array address is not received from said first port.

8. A multi-port RAM, comprising:

an array of memory locations for storing data, each of said memory locations having an address associated therewith;

a plurality of ports, each for receiving an address and for transfer of data;

an arbitration memory location for storing arbitration status information, said arbitration memory location having an arbitration address associated therewith, said arbitration address being continuous with the sequence of said memory locations of said array;

data/address transfer means for selecting one of said ports to access said array and transferring the address received by the selected one of said ports to said array and transferring data between the selected one of said ports and said array;

compare means for comparing said received address on each of said ports with an internally stored reference arbitration address, said compare means making a true comparison when the address compared to said reference arbitration address is said arbitration address;

arbitration access means for accessing said arbitration memory location in response to said compare means making a true comparison, said arbitration access means outputting said arbitration status information to the one of said ports from which said arbitration address was received; and priority means, connected to see addresses received at said ports, for determining the priority of each of said ports in accordance with a predetermined priority status when an address other than said arbitration address is received from any one of said ports, said priority means controlling said data/address transfer means to select the highest priority one of said ports that receives an address other than said arbitration address.

9. The multi-port RAM of claim 8 wherein said arbitration memory location is comprised of a plurality of data fields that comprise said arbitration status information, each data filed associated with one of said ports, and wherein said arbitration access means further comprises means for receiving data and write control information and transferring said received data from the one of said ports receiving said arbitration address to the associated one of said fields in said arbitration memory location, said arbitration access means further comprising means for receiving read control information from the one of said ports receiving said arbitration address and outputting said arbitration status information to the one of said ports receiving said arbitration address and associated read control information.

10. The multi-port RAM of claim 9 wherein said arbitration memory location further comprises a system status field for containing system status information for transmission to the ones of said ports receiving said arbitration address and associated read control information.

11. The multi-port RAM of claim 8 and further comprising means for changing said reference arbitration address in response to arbitration address control signals received external to the multi-port RAM.

12. The multi-port RAM of claim 11 wherein said arbitration address control signals are received through a predetermined one of said ports.

13. The multi-port RAM of claim 8 wherein said predetermined priority status provides priority to the one of said ports that receives an address other than said arbitration address during a time when data is not being transferred between any of said ports and said array by said data/address transfer means.

14. The multi-port RAM of claim 8 wherein said predetermined priority status assigns a priority to each of said ports such that the highest priority one thereof from which an address other than said arbitration address is received is selected.

15. The multi-port RAM of claim 8 wherein said plurality of ports comprise at least one serial port for receiving a serial address and transferring serial data and address information, and at least one parallel port for receiving a parallel address and transferring parallel data and address information.

16. The multi-port RAM of claim 8 wherein each of said memory locations comprises a predetermined number of data bits, each data bit stored in an individual memory cell, wherein said array is comprised of a plurality of said memory cells arranged in rows and columns.

17. A method for accessing an array of separately addressable memory locations from one of a plurality of ports for transfer of data between the plurality of ports and the array in accordance with addresses received at the ports, comprising the steps of:
providing an internal register for storing arbitration status information, the internal register having an arbitration address associated therewith;
comparing the received address on each of the ports with an internally stored reference arbitration address, a true comparison made when the address compared to the reference arbitration address is the arbitration address;
accessing the internal register in response to a true comparison being made and outputting the arbitration status information to the one of the ports from which the arbitration address was received;
determining the priority of each of the ports in accordance with a predetermined priority status when an address other than the arbitration address is received from any one of the ports; and
selecting the highest priority one of the ports that receives an address other than the arbitration address and transferring the address received by the selected one of the ports to the array and transferring data between the selected one of the ports and the array.

18. The method of claim 17 wherein the internal register is comprised of a plurality of data fields that comprise the arbitration status information, each data field associated with one of the ports and further comprising:
receiving data and write control information and transferring the received data from the one of the ports receiving the arbitration address to the associated one of the fields in the internal register; and
receiving read control information from the one of the ports receiving the arbitration address and outputting the arbitration status information to the one of the ports receiving the arbitration address and the associated read control information.

19. The method of claim 18 wherein the internal register further comprises a system status field for containing system status information for transmission to the ones of the ports receiving the arbitration address and associated read control information.

20. The method of claim 17 wherein the predetermined priority status provides priority to the one of the ports that receives an address other than the arbitration address during a time when data is not being transferred between any of the ports and the array.

21. The method of claim 17 wherein the predetermined priority status assigns a priority to each of the ports such that the highest priority thereof from which an address other than the arbitration address is received is selected.

22. The method of claim 17 and further comprising means for changing the internally stored reference arbitration address in response to receiving external arbitration address control signals.

* * * * *